United States Patent
Watanabe

(10) Patent No.: US 6,548,443 B1
(45) Date of Patent: Apr. 15, 2003

(54) OLEFIN POLYMERIZATION CATALYST AND PROCESS FOR PRODUCING OLEFIN POLYMER

(75) Inventor: Tsuyoshi Watanabe, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 71 days.

(21) Appl. No.: 09/650,049

(22) Filed: Aug. 29, 2000

(30) Foreign Application Priority Data

Aug. 31, 1999 (JP) .......................................... 11-245629

(51) Int. Cl.⁷ .............................. B01J 31/38; C08F 4/44
(52) U.S. Cl. ....................... 502/155; 502/152; 502/167; 526/161; 526/171; 526/160
(58) Field of Search ................................ 526/160, 161, 526/171, 348.6; 502/152, 155, 167

(56) References Cited

U.S. PATENT DOCUMENTS

| | | |
|---|---|---|
| 5,908,903 A | 6/1999 | Rosch |
| 6,100,213 A | 8/2000 | Kumamoto et al. |
| 6,121,401 A * | 9/2000 | Yamamoto et al. ...... 526/348.6 |
| 6,184,319 B1 * | 2/2001 | Sato et al. ................... 526/161 |
| 6,187,889 B1 * | 2/2001 | Oi et al. ..................... 526/347 |

FOREIGN PATENT DOCUMENTS

| | | |
|---|---|---|
| DE | 197 11 304 A1 | 10/1997 |
| EP | 0 561 476 A1 | 9/1993 |
| EP | 0842939 A1 | 5/1998 |
| EP | A10887355 | 12/1998 |
| EP | A20985673 | 3/2000 |
| JP | 06136053 A | 5/1994 |
| JP | A06329713 | 11/1994 |
| JP | 06329714 A | 11/1994 |
| JP | 10036423 A | 2/1998 |
| WO | WO 9410180 | 11/1994 |
| WO | A19929741 | 6/1999 |

* cited by examiner

Primary Examiner—David W. Wu
Assistant Examiner—R. Harlan
(74) Attorney, Agent, or Firm—Birch, Stewart, Kolasch & Birch, LLP

(57) ABSTRACT

An olefin polymerization catalyst prepared by contacting a specified transition metal compound(A) having a cyclopentadiene type anion skeletons in its molecule with a modified aluminum oxy compound (B) obtained by reacting an aluminum oxy compound(B1) with a compound having a hydroxyl group(B2), and a process for producing an olefin polymer using the olefin polymerization catalyst.

24 Claims, 1 Drawing Sheet

OLEFIN POLYMERIZATION CATALYST AND PROCESS FOR PRODUCING OLEFIN POLYMER

BACKGROUND OF THE INVENTION

1. Field of the Invention

The present invention relates to an olefin polymerization catalyst prepared by using a modified aluminumoxy compound as one component and a process for producing an olefin polymer with said catalyst.

2. Description of Related Arts

Many processes for producing an olefin polymer using a metallocene complex have been already reported. For example, a process for producing an olefin polymer, using a metallocene complex and an aluminoxane is reported in JP58-19306A. However, this process using bis($\eta^5$-cyclopentadienyl)zirconium dichloride and methylaluminoxane has insufficient activity from the industrial viewpoint, and the molecular weight of the olefin polymer obtained was low.

In order to solve these problems, many proposals on the improvement of an aluminum oxy compound have been made. For example, polymerization processes using a metallocene, an aluminum oxy compound and phenols having a bulky substituent are disclosed in JP6-136053A and JP9-291107A. A catalyst system using a metallocene, an aluminum oxy compound and a monoalkyl bis(aryloxy) aluminum is disclosed in JP-A-10-36423.

An olefin polymerization process using zirconocene and an aluminum oxy compound having an electron withdrawing group or a group which contains an electron withdrawing group is disclosed in JP-A-06-329714. Further, a polymerization process using zirconocene and aryloxyaluminoxane having an electron withdrawing group is disclosed in WO94-10180.

However, the processes described above are not necessarily sufficient in the catalytic activity, and therefore the improvement of the catalyst activity has been desired.

SUMMARY OF THE INVENTION

An objective of the present invention is to provide a highly active olefin polymerization catalyst using a metallocene-based transition metal compound and a process for producing an olefin polymer with said catalyst.

That is, the present invention relates to an olefin polymerization catalyst prepared by contacting (A) with (B) described below, and further to an olefin polymerization catalyst prepared by contacting (C), (D) or (C) and (D) in addition to said (A) and (B), as components described below:

(A) a transition metal compound selected from the group consisting of transition compounds represented by the general formulas (I), (II) and (III);

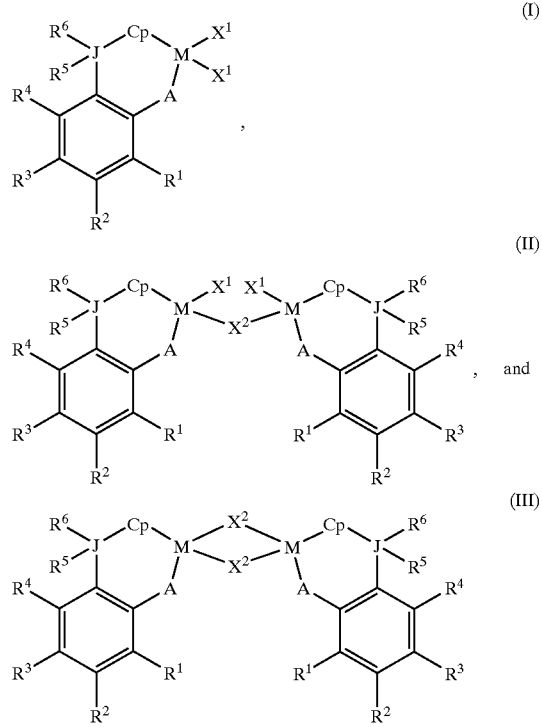

wherein, in the general formula (I), (II) or (III), M represents a transition metal atom of the Group IV of the Periodic Table of the Elements; A represents an atom of the Group XVI of the Periodic Table of the Elements; J represents an atom of the Group XIV of the Periodic Table of the Elements; Cp represents a group having a cyclopentadiene type anion skeleton; each of $X^1$, $R^1$, $R^2$, $R^3$, $R^4$, $R^5$ and $R^6$ independently represents a hydrogen atom, a halogen atom, an alkyl group, an aralkyl group, an aryl group, a substituted silyl group, an alkoxy group, an aralkyloxy group, an aryloxy group, a di-substituted amino group, an alkylthio group, an aralkylthio group, an arylthio group, an alkylseleno group, an aralkylseleno group or arylseleno group; $X^2$ represents an atom of Group XVI of the Periodic Table of the Elements; $R^1$, $R^2$, $R^3$, $R^4$, $R^5$ and $R^6$ may be optionally combined with each other to form a ring; and in the general formula (II) or (III), two of M, A, J, Cp, $X^1$, $X^2$, $R^1$, $R^2$, $R^3$, $R^4$, $R^5$ and $R^6$ may be respectively the same or different.), (B) Modified aluminum oxy compound
 a modified aluminum oxy compound (B) obtained by reacting (B1) with (B2) described below;
 (B1) an aluminum oxy compound, and
 (B2) a compound having a hydroxyl group.
(C) at least one aluminum compound selected from the following (C1) to (C3);
 (C1) an organoaluminum compound represented by the general formula $E^1{}_a AlZ_{3-a}$,
 (C2) a cyclic aluminoxane having a structure represented by the general formula $\{-Al(E^2)-O-\}_b$, and
 (C3) a linear aluminoxane having a structure represented by the general formula $E^3\{-Al(E^3)-O-\}_c AlE^3{}_2$ (wherein $E^1$, $E^2$ and $E^3$ respectively represents a hydrocarbon group, all of $E^1$, $E^2$ and $E^3$ may be the same or different, Z represents a hydrogen atom or a halogen atom, and all of Z may be the same or different, a represents a numeral satisfying $0<a \leq 3$, b represents an integer of not less than 2, and c represents an integer of not less than 1); and (D) any one of boron compounds of (D1) to (D3) described below:
  (D1) a boron compound represented by the general formula $BQ^1Q^2Q^3$;
  (D2) a boron compound represented by the general formula $G^+(BQ^1Q^2Q^3Q^4)^-$; and
  (D3) a boron compound represented by the general formula $(L-H)^+(BQ^1Q^2Q^3Q^4)^-$ (wherein B is a boron atom in the trivalent valence state; $Q^1$ to $Q^4$ are a halogen atom, a hydrocarbon group, a halogenated hydrocarbon group, a substituted silyl group, an alkoxy group or a di-substituted amino group which may be the same or different; $G^+$ is an inorganic or organic cation; L is a neutral Lewis base; and $(L-H)^+$ is a Brønsted acid).

Further, the present invention relates to a process for producing an olefin polymer which comprises polymerizing an olefin with the olefin polymerization catalyst described above.

DETAILED DESCRIPTION OF THE INVENTION

Figure 1:
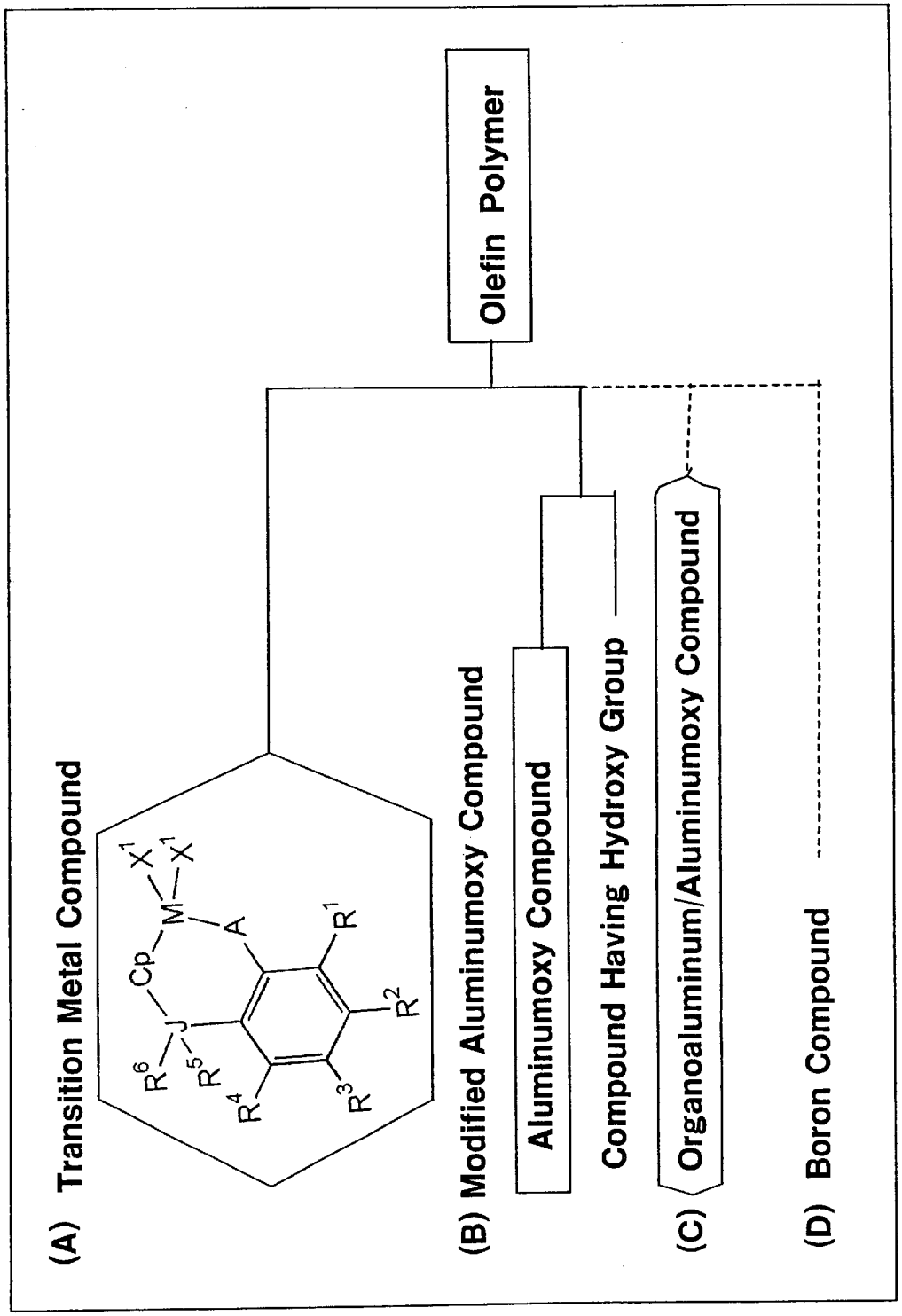
FIG. 1 shows a flow chart for assisting the understanding of the present invention. The flow chart is a typical example of the mode of operation of the present invention, but the present invention is not limited thereto.

The present invention is further illustrated in detail below.

(A)Transition Metal Compound

The transition metal compound used in the present invention is a transition metal compound selected from the group consisting of transition metal compounds represented by the general formulas (I) to (III) described above.

In a transition metal compound represented by the general formula (I), (II) or (III), M represents a transition metal atom of the Group IV of the Periodic Table of the Elements (Revised edition of IUPAC Inorganic Chemistry Nomenclature 1989), and examples thereof include a titanium atom, a zirconium atom, a hafnium atom and the like. A titanium atom or a zirconium atom is preferable.

Further, examples of the group having a cyclopentadiene type anion skeleton represented as the substituent group, Cp, include an $\eta^5$-(substituted)cyclopentadienyl group, an $\eta^5$-(substituted)indenyl group, an $\eta^5$-(substituted)fluorenyl group and the like. Specific examples include an $\eta^5$-cyclopentadienyl group, an $\eta^5$-methylcyclopentadienyl group, an $\eta^5$-dimethylcyclopentadienyl group, an $\eta^5$-trimethylcyclopentadienyl group, an $\eta^5$-tetramethylcyclopentadienyl group, an $\eta^5$-ethylcyclopentadienyl group, an $\eta^5$-n-propylcyclopentadienyl group, an $\eta^5$-isopropylcyclopentadienyl group, an $\eta^5$-n-butylcyclopentadienyl group, an $\eta^5$-sec-butylcyclopentadienyl group, an $\eta^5$-tert-butylcyclopentadienyl group, an $\eta^5$-phenylcyclopentadienyl group, an $\eta^5$-trimethylsilylcyclopentadienyl group, an $\eta^5$-tert-butyldimethylsilylcyclopentadienyl group, an $\eta^5$-indenyl group, an $\eta^5$-methylindenyl group, an $\eta^5$-dimethylindenyl group, an $\eta^5$-n-propylindenyl group, an $\eta^5$-isopropylindenyl group, an $\eta^5$-n-butylindenyl group, an $\eta^5$-tert-butylindenyl group, an $\eta^5$-phenylindenyl group, an $\eta^5$-methylphenylindenyl group, an $\eta^5$-naphthylindenyl group, an $\eta^5$-trimethylsilylindenyl group, an $\eta^5$-tetrahydroindenyl group, an $\eta^5$-fluorenyl group, an $\eta^5$-methylfluorenyl group, an $\eta^5$-dimethylfluorenyl group, an $\eta^5$-tert-butylfluorenyl group, an $\eta^5$-di-tert-butylfluorenyl group, an $\eta^5$-phenylfluorenyl group, an $\eta^5$-diphenylfluorenyl group, an $\eta^5$-trimethylsilylfluorenyl group, an $\eta^5$-bis-trimethylsilylfluorenyl group and the like. An $\eta^5$-cyclopentadienyl group, an $\eta^5$-methylcyclopentadienyl group, an $\eta^5$-n-butylcyclopentadienyl group, an $\eta^5$-tert-butylcyclopentadienyl group, an $\eta^5$-tetramethylcyclopentadienyl group, an $\eta^5$-indenyl group, an $\eta^5$-tetrahydroindenyl group or an $\eta^5$-fluorenyl group is preferable.

As the halogen atom in the substituent, $X^1$, $R^1$, $R^2$, $R^3$, $R^4$, $R^5$ or $R^6$, a fluorine atom, a chlorine atom, a bromine atom and an iodine atom are illustrated. A chlorine atom or a bromine atom is preferable and a chlorine atom is more preferable.

As the alkyl group in the substituent, $X^1$, $R^1$, $R^2$, $R^3$, $R^4$, $R^5$ or $R^6$, an alkyl group having 1 to 20 carbon atoms is preferred, and examples include a methyl group, an ethyl group, a n-propyl group, an isopropyl group, a n-butyl group, a sec-butyl group, a tert-butyl group, an isobutyl group, a n-pentyl group, a neopentyl group, a sec-amyl group, a n-hexyl group, a n-octyl group, a n-decyl group, a n-dodecyl group, a n-pentadecyl group, a n-eicosyl group and the like, and a methyl group, an ethyl group, an isopropyl group, a tert-butyl group or an isobutyl group or a sec-amyl group is more preferable.

All of these alkyl groups may be substituted with a halogen atom such as a fluorine atom, a chlorine atom, a bromine atom or an iodine atom. Examples of the alkyl group having 1 to 10 carbon atoms which is substituted with the halogen atom, include a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group, a perbromopropyl group and the like.

Further, all of these alkyl groups may be partially substituted with an alkoxy group such as a methoxy group, an ethoxy group or the like, an aryloxy group such as a phenoxy group or the like or an aralkyloxy group such as a benzyloxy group or the like, etc.

As the aralkyl group in the substituent, $X^1$, $R^1$, $R^2$, $R^3$, $R^4$, $R^5$ or $R^6$, an aralkyl group having 7 to 20 carbon atoms is preferable, and examples thereof include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl) methyl group, a (tert-butylphenyl)methyl group, a (n-pentylphenyl)methyl group, a (neopentylphenyl)methyl group, a (n-hexylphenyl)methyl group, a (n-octylphenyl) methyl group, a (n-decylphenyl)methyl group, a (n-dodecylphenyl)methyl group, a naphthylmethyl group, an anthracenylmethyl group and the like, and a benzyl group is more preferable.

All of these aralkyl groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

As the aryl group in the substituent, $X^1$, $R^1$, $R^2$, $R^3$, $R^4$, $R^5$ or $R^6$, an aryl group having 6 to 20 carbon atoms is preferable, and examples thereof include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, an anthracenyl group and the like, and a phenyl group is more preferable.

All of these aryl groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

The substituted silyl group in the substituent, $X^1$, $R^1$, $R^2$, $R^3$, $R^4$, $R^5$ or $R^6$, is a silyl group substituted with a hydrocarbon group, and examples of the hydrocarbon group include alkyl groups having 1 to 10 carbon atoms such as a methyl group, an ethyl group, a n-propyl group, an isopropyl group, a n-butyl group, a sec-butyl group, a tert-butyl group, an isobutyl group, a n-pentyl group, a n-hexyl group, a cyclohexyl group and the like, and aryl groups having up to 10 carbon atoms such as a phenyl group and the like, etc. Examples of such substituted silyl group having 1 to 20 carbon atoms include mono-substituted silyl groups having 1 to 20 carbon atoms such as a methylsilyl group, an ethylsilyl group, a phenylsilyl group and the like; di-substituted silyl groups having 2 to 20 carbon atoms such as a dimethylsilyl group, a diethylsilyl group, a diphenylsilyl group and the like; and tri-substituted silyl groups having 3 to 20 carbon atoms such as a trimethylsilyl group, a triethylsilyl group, a tri-n-propylsilyl group, a triisopropylsilyl group, a tri-n-butylsilyl group, a tri-sec-butylsilyl group, a tri-tert-butylsilyl group, a tri-isobutylsilyl group, a tert-butyl-dimethylsilyl group, a tri-n-pentylsilyl group, a tri-n-hexylsilyl group, a tricyclohexylsilyl group, a triphenylsilyl group and the like, and a trimethylsilyl group, a tert-butyldimethylsilyl group or a triphenylsilyl group is preferable.

All of the hydrocarbon groups of these substituted silyl groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

As the alkoxy group in the substituent, $X^1$, $R^1$, $R^2$, $R^3$, $R^4$, $R^5$ or $R^6$, an alkoxy group having 1 to 20 carbon atoms is preferable, and examples thereof include a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group, a n-eicosoxy group and the like, and a methoxy group, an ethoxy group, an isopropoxy group or a tert-butoxy group is preferable.

All of these alkoxy groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

As the aralkyloxy group in the substituent, $X^1$, $R^1$, $R^2$, $R^3$, $R^4$, $R^5$ or $R^6$, an aralkyloxy group having 7 to 20 carbon atoms is preferable, and examples thereof include a benzyloxy group, a (2-methylphenyl)methoxy group, a (3-methylphenyl)methoxy group, a (4-methylphenyl) methoxy group, a (2,3-dimethylphenyl)methoxy group, a (2,4-dimethylphenyl)methoxy group, a (2,5-dimethylphenyl)methoxy group, a (2,6-dimethylphenyl) methoxy group, a (3,4-dimethylphenyl)methoxy group, a (3,5-dimethylphenyl)methoxy group, a (2,3,4-trimethylphenyl)methoxy group, a (2,3,5-trimethylphenyl) methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl) methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl) methoxy group, a (n-propylphenyl)methoxy group, an (isopropylphenyl)methoxy group, (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl) methoxy group, a naphthylmethoxy group, an anthracenylmethoxy group and the like, and a benzyloxy group is more preferable.

All of these aralkyloxy groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

As the aryloxy group in the substituent $X^1$, $R^1$, $R^2$, $R^3$, $R^4$, $R^5$ or $R^6$, an aryloxy group having 6 to 20 carbon atoms is preferable, and examples thereof include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6- trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-di-methylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group, an anthracenoxy group and the like.

All of these aryloxy groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

The di-substituted amino group in the substituent, $X^1$, $R^1$, $R^2$, $R^3$, $R^4$, $R^5$ or $R^6$, is an amino group substituted with two hydrocarbon groups or silyl groups, and examples of the hydrocarbon group include alkyl groups having 1 to 10 carbon atoms such as a methyl group, an ethyl group, a n-propyl group, an isopropyl group, a n-butyl group, a sec-butyl group, a tert-butyl group, an isobutyl group, a n-pentyl group, a n-hexyl group, a cyclohexyl group and the like; aryl groups having 6 to 10 carbon atoms such as a phenyl group and the like; aralkyl groups having 7 to 10 carbon atoms such as a benzyl group and the like, etc. The silyl group include, for example, a trimethylsilyl group, tert-butyldimethylsilyl group and the like. Examples of such di-substituted amino group include a dimethylamino group, a diethylamino group, a di-n-propylamino group, a diisopropylamino group, a di-n-butylamino group, a di-sec-butylamino group, a di-tert-butylamino group, a di-isobutylamino group, a tert-butylisopropylamino group, a di-n-hexylamino group, a di-n-octylamino group, a diphenylamino group, a bistrimethylsilylamino group, a bis-tert-butyldimethylsilylamino group and the like, and a dimethylamino group, an diethylamino group, a diisopropylamino group, a di-tert-butylamino group, a bis-trimethylsilylamino group are preferred.

All of these di-substituted amino groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

As the alkylthio group in the substituent, $X^1$, $R^1$, $R^2$, $R^3$, $R^4$, $R^5$ or $R^6$, an alkylthio group having 1 to 20 carbon atoms is preferred, and examples include a methylthio group, an ethylthio group, a n-propylthio group, an isopropylthio group, a n-butylthio group, a sec-butylthio group, a tert-butylthio group, a n-pentylthio group, a neopentylthio group, a n-hexylthio group, a n-octylthio group, a n-dodecylthio group, a n-pentadecylthio group, a n-eicosylthio group and the like, and a methylthio group, an ethylthio group, an isopropylthio group or a tert-butylthio group is more preferable.

All of these alkylthio groups may be substituted with a halogen atom such as a fluorine atom, a chlorine atom, a bromine atom or an iodine atom. Further, all of these alkylthio groups may be partially substituted with an alkoxy group such as a methoxy group, an ethoxy group or the like, an aryloxy group such as a phenoxy group or the like or an aralkyloxy group such as a benzyloxy group or the like, etc.

As the aralkylthio group in the substituent, $X^1$, $R^1$, $R^2$, $R^3$, $R^4$, $R^5$ or $R^6$, an aralkylthio group having 7 to 20 carbon atoms is preferable, and examples thereof include a benzylthio group, a (2-methylphenyl)methylthio group, a (3-methylphenyl)methylthio group, a (4-methylphenyl)methylthio group, a (2,3-dimethylphenyl)methylthio group, a (2,4-dimethylphenyl)methylthio group, a (2,5-dimethylphenyl)methylthio group, a (2,6-dimethylphenyl)methylthio group, a (3,4-dimethylphenyl)methylthio group, a (3,5-dimethylphenyl)methylthio group, a (2,3,4-timethylphenyl)methylthio group, a (2,3,5-timethylphenyl)methylthio group, a (2,3,6-timethylphenyl)methylthio group, a (2,4,5-timethylphenyl)methylthio group, a (2,4,6-timethylphenyl)methylthio group, a (3,4,5-timethylphenyl)methylthio group, a (2,3,4,5-tetramethylphenyl)methylthio group, a (2,3,4,6-tetramethylphenyl)methylthio group, a (2,3,5,6-tetramethylphenyl)methylthio group, a (pentamethylphenyl)methylthio group, an (ethylphenyl)methylthio group, a (n-propylphenyl)methylthio group, an (isopropylphenyl)methylthio group, a (n-butylphenyl)methylthio group, a (sec-butylphenyl)methylthio group, a (tert-butylphenyl)methylthio group, a (n-hexylphenyl)methylthio group, a (n-octylphenyl)methylthio group, a (n-decylphenyl)methylthio group, a naphthylmethylthio group, an anthracenylmethylthio group and the like, and a benzylthio group is more preferable.

All of these aralkylthio groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc As the arylthio group in the substituent, $X^1$, $R^1$, $R^2$, $R^3$, $R^4$, $R^5$ or $R^6$, an arylthio group having 6 to 20 carbon atoms is preferable, and examples thereof include a phenylthio group, a 2-tolylthio group, a 3-tolylthio group, a 4-tolylthio group, a 2,3-xylylthio group, a 2,4-xylylthio group, a 2,5-xylylthio group, a 2,6-xylylthio group, a 3,4-xylylthio group, a 3,5-xylylthio group, a 2-tert-butyl-3-methylphenylthio group, a 2-tert-butyl-4-methylphenylthio group, a 2-tert-butyl-5-methylphenylthio group, a 2-tert-butyl-6-methylphenylthio group, a 2,3,4-trimethylphenylthio group, a 2,3,5-trimethylphenylthio group, a 2,3,6-trimethylphenylthio group, a 2,4,5-trimethylphenylthio group, a 2,4,6-trimethylphenylthio group, a 2-tert-butyl-3,4-dimethylphenylthio group, a 2-tert-butyl-3,5-dimethylphenylthio group, a 2-tert-butyl-3,6-dimethylphenylthio group, a 2,6-di-tert-butyl-3-methylphenylthio group, a 2-tert-butyl-4,5-dimethylphenylthio group, a 2,6-di-tert-butyl-4-methylphenylthio group, a 3,4,5-trimethylphenylthio group, a 2,3,4,5-tetramethylphenylthio group, a 2,3,4,6-tetramethylphenylthio group, a 2-tert-butyl-3,4,6-trimethylphenylthio group, a 2,6-di-tert-butyl-3,4-dimethylphenylthio group, a 2,3,5,6-tetramethylphenylthio group, a 2-tert-butyl-3,5,6-trimethylphenylthio group, a 2,6-di-tert-butyl-3,5-dimethylphenulthio group, a pentamethylphenylthio group, an ethylphenylthio group, a n-propylphenylthio group, an isopropylphenylthio group, a n-butylphenylthio group, a sec-butylphenylthio group, a tert-butylphenylthio group, a n-pentylphenylthio group, a neopentylphenylthio group, a n-hexylphenylthio group, a n-octylphenylthio group, a n-decylphenylthio group, a n-tetradecylphenylthio group, a naphthylthio group, an anthracenylthio group and the like.

All of these arylthio groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like.

As the alkylseleno group in the substituent, $X^1$, $R^1$, $R^2$, $R^3$, $R^4$, $R^5$ or $R^6$, an alkyl group having 1 to 20 carbon atoms is preferred, and examples include a methylseleno group, an ethylseleno group, a n-propylseleno group, an isopropylseleno group, a n-butylseleno group, a sec-butylseleno group, a tert-butylseleno group, a n-pentylseleno group, a neopentylseleno group, a n-hexylseleno group, a n-octylseleno group, a n-dodecylseleno group, a n-pentadecylseleno group, a n-eicosylseleno group and the like, and a methylseleno group, an ethylseleno group, an isopropylseleno group or a tert-butylseleno group is more preferable.

All of these alkylseleno groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like.

As the aralkylseleno group in the substituent, $X^1$, $R^1$, $R^2$, $R^3$, $R^4$, $R^5$ or $R^6$, an aralkylseleno group having 7 to 20 carbon atoms is preferable, and examples thereof include a benzylseleno group, a (2-methylphenyl)methylseleno group, a (3-methylphenyl)methylseleno group, a (4-methylphenyl)methylseleno group, a (2,3-dimethylphenyl)methylseleno group, a (2,4-dimethylphenyl)methylseleno group, a (2,5-dimethylphenyl)methylseleno group, a (2,6-dimethylphenyl)methylseleno group, a (3,4-dimethylphenyl)methylseleno group, a (3,5-dimethylphenyl)methylseleno group, a (2,3,4-timethylphenyl)methylseleno group, a (2,3,5-timethylphenyl)methylseleno group, a (2,3,6-timethylphenyl)methylseleno group, a (2,4,5-timethylphenyl)methylseleno group, a (2,4,6-timethylphenyl)methylseleno group, a (3,4,5-timethylphenyl)methylseleno group, a (2,3,4,5-tetramethylphenyl)methylseleno group, a (2,3,4,6-tetramethylphenyl)methylseleno group, a (2,3,5,6-tetramethylphenyl)methylseleno group, a (pentamethylphenyl)methylseleno group, an (ethylphenyl)methylseleno group, a (n-propylphenyl)methylseleno group, an (isopropylphenyl)methylseleno group, a (n-butylphenyl)methylseleno group, a (sec-butylphenyl)methylseleno group, a (tert-butylphenyl)methylseleno group, a (n-hexylphenyl)methylseleno group, a (n-octylphenyl)methylseleno group, a (n-decylphenyl)methylseleno group, a naphthylmethylseleno group, an anthracenylmethylseleno group and the like, and a benzylseleno group is more preferable.

All of these aralkylseleno groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like.

As the arylseleno group in the substituent, $X^1$, $R^1$, $R^2$, $R^3$, $R^4$, $R^5$ or $R^6$, an arylseleno group having 6 to 20 carbon atoms is preferable, and examples thereof include a phenylseleno group, a 2-tolylseleno group, a 3-tolylseleno group, a 4-tolylseleno group, a 2,3-xylylseleno group, a 2,4-xylylseleno group, a 2,5-xylylseleno group, a 2,6-xylylseleno group, a 3,4-xylylseleno group, a 3,5-xylylseleno group, a 2-tert-butyl-3-methylphenylseleno group, a 2-tert-butyl-4-methylphenylseleno group, a 2-tert-butyl-5-methylphenylseleno group, a 2-tert-butyl-6-methylphenylseleno group, a 2,3,4-trimethylphenylseleno group, a 2,3,5-trimethylphenylseleno group, a 2,3,6-trimethylphenylseleno group, a 2,4,5-trimethylphenylseleno group, a 2,4,6-trimethylphenylseleno group, a 2-tert-butyl-3,4-dimethylphenylseleno group, a 2-tert-butyl-3,5-dimethylphenylseleno group, a 2-tert-butyl-3,6-dimethylphenylseleno group, a 2,6-di-tert-butyl-3-methylphenylseleno group, a 2-tert-butyl-4,5-dimethylphenylseleno group, a 2,6-di-tert-butyl-4-methylphenylseleno group, a 3,4,5-trimethylphenylseleno group, a 2,3,4,5-tetramethylphenylseleno group, a 2,3,4,6-tetramethylphenylseleno group, a 2-tert-butyl-3,4,6-trimethylphenylseleno group, a 2,6-di-tert-butyl-3,4-dimethylphenylseleno group, a 2,3,5,6-tetramethylphenylseleno group, a 2-tert-butyl-3,5,6-trimethylphenylseleno group, a 2,6-di-tert-butyl-3,5-dimethylphenulseleno group, a pentamethylphenylseleno group, an ethylphenylseleno group, a n-propylphenylseleno group, an isopropylphenylseleno group, a n-butylphenylseleno group, a sec-butylphenylseleno group, a tert-butylphenylseleno group, a n-pentylphenylseleno group, a neopentylphenylseleno group, a n-hexylphenylseleno group, a n-octylphenylseleno group, a n-decylphenylseleno group, a n-tetradecylphenylseleno group, a naphthylseleno group, an anthracenylseleno group and the like.

All of these arylseleno groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like.

$X^1$ is preferably a halogen atom, an alkyl group, an aralkyl group, an alkoxy group, an aryloxy group or a di-substituted amino group, and more preferably a halogen atom, an alkyl group, an alkoxy group or an aryloxy group.

$R^1$, $R^2$, $R^3$ and $R^4$ are preferably independently hydrogen, a halogen atom, an alkyl group, an aralkyl group, an aryl group, a substituted silyl group, an alkoxy group, an aralkyloxy group or an aryloxy group, and among them, $R^1$ is preferably an alkyl group, an aryl group or a substituted silyl group in particular.

In the general formula (I), (II) or (III), each of $R^5$ and $R^6$ is preferably independently hydrogen, an alkyl group, an aralkyl group, an aryl group, a substituted silyl group, an alkoxy group, an aralkyloxy group or an aryloxy group.

$X^2$ in the general formula (II) or (III) represents an atom of Group XVI of the Periodic Table of the Elements, and specific examples thereof include an oxygen atom, a sulfur atom and a selenium atom, an oxygen atom or a sulfur atom is preferable and an oxygen atom is more preferable.

Examples of the atom of Group XVI of the Periodic Table of the Elements represented as A in the general formula (I), (II) or (III) include an oxygen atom, a sulfur atom, a selenium atom and the like, and an oxygen atom is preferable.

Examples of the atom of Group XIV of the Periodic Table of the Elements represented as J in the general formula (I), (II) or (III) include for example, a carbon atom, a silicon atom, a germanium atom and the like, and a carbon atom and a silicon atom are preferable.

Specific examples of the transition metal compound having a bridging group in the general formula (I) include transition metal compounds, for example, methylene($\eta^5$-cyclopentadienyl)(3,5-dimethyl-2-phenoxy)titanium dichloride, methylene($\eta^5$-cyclopentadienyl)(3-tert-butyl-2-phenoxy)titanium dichloride, methylene($\eta^5$-cyclopentadienyl)(3-tert-butyl-5-methyl-2-phenoxy)titanium dichloride, methylene($\eta^5$-cyclopentadienyl)(3-phenyl-2-phenoxy)titanium dichloride, methylene($\eta^5$-cyclopentadienyl)(3-tert-butyldimethylsilyl-5-methyl-2-phenoxy)titanium dichloride, methylene($\eta^5$-cyclopentadienyl)(3-trimethylsilyl-5-methyl-2-phenoxy)titanium dichloride, methylene($\eta^5$-cyclopentadienyl)(3-tert-butyl-5-methoxy-2-phenoxy)titanium dichloride, methylene($\eta^5$-cyclopentadienyl)(3-tert-butyl-5-chloro-2-phenoxy)titanium dichloride, methylene($\eta^5$-tetramethylcyclopentadienyl)(3,5-dimethyl-2-phenoxy)titanium dichloride, methylene($\eta^5$-tetramethylcyclopentadienyl)(3-tert-butyl-2-phenoxy)titanium dichloride, methylene($\eta^5$-tetramethylcyclopentadienyl)(3-tert-butyl-5-methyl-2-phenoxy)titanium dichloride, methylene($\eta^5$-tetramethylcyclopentadienyl)(3-phenyl-2-phenoxy)titanium dichloride, methylene($\eta^5$-tetramethylcyclopentadienyl)(3-tert-butyldimethylsilyl-5-methyl-2-phenoxy)titanium dichloride, methylene($\eta^5$-tetramethylcyclopentadienyl)(3-trimethylsilyl-5-methyl-2-phenoxy)titanium dichloride, methylene($\eta^5$-tetramethylcyclopentadienyl)(3-tert-butyl-5-methoxy-2-phenoxy)titanium dichloride, methylene($\eta^5$-tetramethylcyclopentadienyl)(3-tert-butyl-5-chloro-2-phenoxy)titanium dichloride, isopropylidene($\eta^5$-cyclopentadienyl)(3,5-dimethyl-2-phenoxy)titanium dichloride, isopropylidene($\eta^5$-cyclopentadienyl)(3-tert-butyl-2-phenoxy)titanium dichloride, isopropylidene($\eta^5$-cyclopentadienyl)(3-tert-butyl-5-methyl-2-phenoxy)titanium dichloride, isopropylidene ($\eta^5$-cyclopentadienyl)(3-phenyl-2-phenoxy)titanium dichloride, isopropylidene($\eta^5$-cyclopentadienyl)(3-tert-butyldimethylsilyl-5-methyl-2-phenoxy)titanium dichloride, isopropylidene($\eta^5$-cyclopentadienyl)(3-trimethylsilyl-5-methyl-2-phenoxy)titanium dichloride, isopropylidene($\eta^5$-cyclopentadienyl)(3-tert-butyl-5-methoxy-2-phenoxy)titanium dichloride, isopropylidene ($\eta^5$-cyclopentadienyl)(3-tert-butyl-5-chloro-2-phenoxy)titanium dichloride, isopropylidene($\eta^5$-tetramethylcyclopentadienyl)(3,5-dimethyl-2-phenoxy)titanium dichloride, isopropylidene($\eta^5$-tetramethylcyclopentadienyl)(3-tert-butyl-2-phenoxy)titanium dichloride, isopropylidene($\eta^5$-tetramethylcyclopentadienyl)(3-tert-butyl-5-methyl-2-phenoxy)titanium dichloride, isopropylidene($\eta^5$-tetramethylcyclopentadienyl)(3-phenyl-2-phenoxy)titanium dichloride, isopropylidene($\eta^5$-tetramethylcyclopentadienyl)(3-tert-butyldimethylsilyl-5-methyl-2-phenoxy)titanium dichloride, isopropylidene($\eta^5$-tetramethylcyclopentadienyl)(3-trimethylsilyl-5-methyl-2-phenoxy)titanium dichloride, isopropylidene($\eta^5$-tetramethylcyclopentadienyl)(3-tert-butyl-5-methoxy-2-phenoxy)titanium dichloride, isopropylidene($\eta^5$-tetramethylcyclopentadienyl)(3-tert-butyl-5-chloro-2-phenoxy)titanium dichloride, diphenylmethylene($\eta^5$-cyclopentadienyl)(3,5-dimethyl-2-phenoxy)titanium dichloride, diphenylmethylene($\eta^5$-cyclopentadienyl)(3-tert-butyl-2-phenoxy)titanium dichloride, diphenylmethylene($\eta^5$-cyclopentadienyl)(3-tert-butyl-5-methyl-2-phenoxy)titanium dichloride, diphenylmethylene($\eta^5$-cyclopentadienyl)(3-phenyl-2-phenoxy)titanium dichloride, diphenylmethylene($\eta^5$-cyclopentadienyl)(3-tert-butyldimethylsilyl-5-methyl-2-phenoxy)titanium dichloride, diphenylmethylene($\eta^5$-cyclopentadienyl)(3-trimethylsilyl-5-methyl-2-phenoxy)titanium dichloride, diphenylmethylene($\eta^5$-cyclopentadienyl)(3-tert-butyl-5-methoxy-2-phenoxy)titanium dichloride, diphenylmethylene($\eta^5$-cyclopentadienyl)(3-tert-butyl-5-chloro-2-phenoxy)titanium dichloride, diphenylmethylene($\eta^5$-tetramethylcyclopentadienyl)(3,5-dimethyl-2-phenoxy)titanium dichloride, diphenylmethylene($\eta^5$-tetramethylcyclopentadienyl)(3-tert-butyl-2-phenoxy)titanium dichloride, diphenylmethylene($\eta^5$-tetramethylcyclopentadienyl)(3-tert-butyl-5-methyl-2-phenoxy)titanium dichloride, diphenylmethylene($\eta^5$-tetramethylcyclopentadienyl)(3-phenyl-2-phenoxy)titanium dichloride, diphenylmethylene($\eta^5$-tetramethylcyclopentadienyl)(3-tert-butyldimethylsilyl-5-methyl-2-phenoxy)titanium dichloride, diphenylmethylene($\eta^5$-tetramethylcyclopentadienyl)(3-trimethylsilyl-5-methyl-2-phenoxy)titanium dichloride, diphenylmethylene($\eta^5$-tetramethylcyclopentadienyl)(3-tert-butyl-5-methoxy-2-phenoxy)titanium dichloride, diphenylmethylene($\eta^5$-tetramethylcyclopentadienyl)(3-tert-butyl-5-chloro-2-phenoxy)titanium dichloride and the like; compounds wherein titanium of these compounds is replaced by zirconium or hafnium; compounds wherein dichloride of these compounds is replaced by dimethyl, dibenzyl, dimethoxide, diphenoxide, bis(dimethylamino) or bis(diethylamino); compounds wherein ($\eta^5$-cyclopentadienyl) of these compounds is replaced by ($\eta^5$-methylcyclopentadienyl), ($\eta^5$-dimethylcyclopentadienyl), ($\eta^5$-trimethylcyclopentadienyl), ($\eta^5$-n-butylcyclopentadienyl),), ($\eta^5$-tert-butylcyclopentadienyl),($\eta^5$-trimethylsilylcyclopentadienyl), ($\eta^5$-tert-butyldimethylsilylcyclopentadienyl), ($\eta^5$-indenyl), ($\eta^5$-methylindenyl), ($\eta^5$-phenylindenyl) or ($\eta^5$-fluorenyl); compounds wherein (3,5-dimethyl-2-phenoxy) of these compounds is replaced by (2-phenoxy), (3-methyl-2-phenoxy), (3,5-di-tert-butyl-2-phenoxy), (3-phenyl-5-methyl-2-phenoxy), (3-tert-butyldimethylsilyl-2-phenoxy) or (3-trimethylsilyl-2-phenoxy); and the like are listed.

Furthermore, dimethylsilylene($\eta^5$-cyclopentadienyl)(2-phenoxy)titanium dichloride, dimethylsilylene($\eta^5$-cyclopentadienyl)(3-methyl-2-phenoxy)titanium dichloride, dimethylsilylene($\eta^5$-cyclopentadienyl)(3,5-dimethyl-2-phenoxy)titanium dichloride, dimethylsilylene($\eta^5$-cyclopentadienyl)(3-tert-butyl-2-phenoxy)titanium dichloride, dimethylsilylene($\eta^5$-cyclopentadienyl)(3-tert-butyl-5-methyl-2-phenoxy)titanium dichloride, dimethylsilylene($\eta^5$-cyclopentadienyl)(3,5-di-tert-butyl-2-phenoxy)titanium dichloride, dimethylsilylene($\eta^5$-cyclopentadienyl)(5-methyl-3-phenyl-2-phenoxy)titanium dichloride, dimethylsilylene($\eta^5$-cyclopentadienyl)(3-tert-butyldimethylsilyl-5-methyl-2-phenoxy)titanium dichloride, dimethylsilylene($\eta^5$-cyclopentadienyl)(5-methyl-3-trimethylsilyl-2-phenoxy)titanium dichloride, dimethylsilylene($\eta^5$-cyclopentadienyl)(3-tert-butyl-5-methoxy-2-phenoxy)titanium dichloride, dimethylsilylene($\eta^5$-cyclopentadienyl)(3-tert-butyl-5-chloro-2-phenoxy)titanium dichloride, dimethylsilylene($\eta^5$-cyclopentadienyl)(3,5-di-sec-amyl-2-phenoxy)titanium dichloride, dimethylsilylene($\eta^5$-cyclopentadienyl)(1-naphtoxy-2-yl)titanium dichloride, dimethylsilylene($\eta^5$-tetramethylcyclopentadienyl)(2-phenoxy)titanium dichloride, dimethylsilylene($\eta^5$-tetramethylcyclopentadienyl)(3-methyl-2-phenoxy)titanium dichloride, dimethylsilylene($\eta^5$-tetramethylcyclopentadienyl)(3,5-dimethyl-2-phenoxy)titanium dichloride, dimethylsilylene($\eta^5$- tetramethylcyclopentadienyl)(3-tert-butyl-2-phenoxy) titanium dichloride, dimethylsilylene($\eta^5$-tetramethylcyclopentadienyl)(3-tert-butyl-5-methyl-2-phenoxy)titanium dichloride, dimethylsilylene($\eta^5$-tetramethylcyclopentadienyl)(3,5-di-tert-butyl-2-phenoxy) titanium dichloride, dimethylsilylene($\eta^5$-tetramethylcyclopentadienyl)(5-methyl-3-phenyl-2-phenoxy)titanium dichloride, dimethylsilylene($\eta^5$-tetramethylcyclopentadienyl)(3-tert-butyldimethylsilyl-5-methyl-2-phenoxy)titanium dichloride, dimethylsilylene ($\eta^5$-tetramethylcyclopentadienyl)(5-methyl-3-trimethylsilyl-2-phenoxy)titanium dichloride, dimethylsilylene($\eta^5$-tetramethylcyclopentadienyl)(3-tert-butyl-5-methoxy-2-phenoxy)titanium dichloride, dimethylsilylene($\eta^5$-tetramethylcyclopentadienyl)(3-tert-butyl-5-chloro-2-phenoxy)titanium dichloride, dimethylsilylene($\eta^5$-tetramethylcyclopentadienyl)(3,5-di-sec-amyl-2-phenoxy)titanium dichloride, and dimethylsilylene($\eta^5$-tetramethylcyclopentadienyl)(1-naphtoxy-2-yl)titanium dichloride; compounds wherein ($\eta^5$-cyclopentadienyl) of these compounds is replaced by ($\eta^5$-methylcyclopentadienyl), ($\eta^5$-dimethylcyclopentadienyl), ($\eta^5$-trimethylcyclopentadienyl), ($\eta^5$-ethylcyclopentadienyl), ($\eta^5$-n-propylcyclopentadienyl), ($\eta^5$-isopropylcyclopentadienyl), ($\eta^5$-n-butylcyclopentadienyl), ($\eta^5$-sec-butylcyclopentadienyl), ($\eta^5$-isobutylcyclopentadienyl), ($\eta^5$-tert-butylcyclopentadienyl), ($\eta^5$-trimethylsilylcyclopentadienyl), ($\eta^5$-tert-butyldimethylsilylcyclopentadienyl), ($\eta^5$-phenylcyclopentadienyl), ($\eta^5$-indenyl), ($\eta^5$-methylindenyl), ($\eta^5$-phenylindenyl) or ($\eta^5$-fluorenyl); compounds wherein (2-phenoxy) of these compounds is replaced by (3-phenyl-2-phenoxy), (3-trimethylsilyl-2-phenoxy) or (3-tert-butyldimethylsilyl-2-phenoxy); compounds wherein dimethylsilylene of these compounds is replaced by diethylsilylene, diphenylsilylene or dimethoxysilylene; compounds wherein titanium of these compounds is replaced by zirconium or hafnium; and compounds wherein dichloride of these compounds is replaced by dimethyl, dibenzyl, dimethoxide, diphenoxide, bis(dimethylamino) or bis(diethylamino); and the like are listed.

Specific examples of the transition metal compound represented by the general formula (II) include $\mu$-oxobis{isopropylidene($\eta^5$-cyclopentadienyl)(2-phenoxy) titanium chloride}, $\mu$-oxobis{isopropylidene($\eta^5$-cyclopentadienyl)(2-phenoxy)titanium methoxide}, $\mu$-oxobis{isopropylidene($\eta^5$-cyclopentadienyl)(3-tert-butyl-5-methyl-2-phenoxy)titanium chloride}, $\mu$-oxobis{isopropylidene($\eta^5$-cyclopentadienyl)(3-tert-butyl-5-methyl-2-phenoxy)titanium methoxide}, $\mu$-oxobis{isopropylidene($\eta^5$-methylcyclopentadienyl)(2-phenoxy)titanium chloride}, $\mu$-oxobis{isopropylidene($\eta^5$-methylcyclopentadienyl)(2-phenoxy)titanium methoxide}, $\mu$-oxobis{isopropylidene($\eta^5$-methylcyclopentadienyl)(3-tert-butyl-5-methyl-2-phenoxy)titanium chloride}, $\mu$-oxobis{isopropylidene($\eta^5$-methylcyclopentadienyl)(3-tert-butyl-5-methyl-2-phenoxy)titanium methoxide}, $\mu$-oxobis{isopropylidene($\eta^5$-tetramethylcyclopentadienyl) (2-phenoxy)titanium chloride}, $\mu$-oxobis{isopropylidene ($\eta^5$-tetramethylcyclopentadienyl)(2-phenoxy)titanium methoxide}, $\mu$-oxobis{isopropylidene($\eta^5$-tetramethylcyclopentadienyl)(3-tert-butyl-5-methyl-2-phenoxy)titanium chloride}, $\mu$-oxobis{isopropylidene($\eta^5$-tetramethylcyclopentadienyl)(3-tert-butyl-5-methyl-2-phenoxy)titanium methoxide}, $\mu$-oxobis{dimethylsilylene ($\eta^5$-cyclopentadienyl)(2-phenoxy)titanium chloride}, $\mu$-oxobis{dimethylsilylene($\eta^5$-cyclopentadienyl)(2-phenoxy)titanium methoxide}, $\mu$-oxobis{dimethylsilylene ($\eta^5$-cyclopentadienyl)(3-tert-butyl-5-methyl-2-phenoxy) titanium chloride},$\mu$-oxobis{dimethylsilylene($\eta^5$-cyclopentadienyl)(3-tert-butyl-5-methyl-2-phenoxy) titanium methoxide}, $\mu$-oxobis{dimethylsilylene($\eta^5$-methylcyclopentadienyl)(2-phenoxy)titanium chloride}, $\mu$-oxobis{dimethylsilylene($\eta^5$-methylcyclopentadienyl)(2-phenoxy)titanium methoxide}, $\mu$-oxobis{dimethylsilylene ($\eta^5$-methylcyclopentadienyl)(3-tert-butyl-5-methyl-2-phenoxy)titanium chloride}, $\mu$-oxobis{dimethylsilylene($\eta^5$-methylcyclopentadienyl)(3-tert-butyl-5-methyl-2-phenoxy) titanium methoxide}, $\mu$-oxobis{dimethylsilylene($\eta^5$-tetramethylcyclopentadienyl)(2-phenoxy)titanium chloride}, $\mu$-oxobis{dimethylsilylene($\eta^5$-tetramethylcyclopentadienyl)(2-phenoxy)titanium methoxide}, $\mu$-oxobis{dimethylsilylene($\eta^5$-tetramethylcyclopentadienyl)(3-tert-butyl-5-methyl-2-phenoxy)titanium chloride},$\mu$-oxobis{dimethylsilylene($\eta^5$-tetramethylcyclopentadienyl)(3-tert-butyl-5-methyl-2-phenoxy)titanium methoxide}; compounds wherein titanium of these compounds is replaced by zirconium or hafnium; compounds wherein chloride of these compounds is replaced by methyl, benzyl, phenoxide, dimethylamino or diethylamino; compounds wherein ($\eta^5$-cyclopentadienyl) of these compounds is replaced ($\eta^5$-dimethylcyclopentadienyl),($\eta^5$-trimethylcyclopentadienyl), ($\eta^5$-n-butylcyclopentadienyl), ($\eta^5$-tert-butylcyclopentadienyl), ($\eta^5$-trimethylsilylcyclopentadienyl), ($\eta^5$-tert-butyldimethylsilylcyclopentadienyl), ($\eta^5$-indenyl), ($\eta^5$-methylindenyl), ($\eta^5$-phenylindenyl) or ($\eta^5$-fluorenyl); and compounds wherein (2-phenoxy) of these compounds is replaced by (3-methyl-2-phenoxy), (3,5-dimethyl-2-phenoxy), (3,5-di-tert-butyl-2-phenoxy), (3-phenyl-5-methyl-2-phenoxy) or (3-trimethylsilyl-5-methyl-2-phenoxy).

Specific examples of the transition metal compound represented by the general formula (III) include di-$\mu$-oxobis{isopropylidene($\eta^5$-cyclopentadienyl)(2-phenoxy) titanium}, di-$\mu$-oxobis{isopropylidene($\eta^5$-cyclopentadienyl)(3-tert-butyl-5-methyl-2-phenoxy) titanium}, di-$\mu$-oxobis{isopropylidene($\eta^5$-methylcyclopentadienyl)(2-phenoxy)titanium}, di-$\mu$-oxobis{isopropylidene($\eta^5$-methylcyclopentadienyl)(3-tert-butyl-5-methyl-2-phenoxy)titanium}, di-$\mu$-oxobis{isopropylidene($\eta^5$-tetramethylcyclopentadienyl)(2-phenoxy)titanium}, di-$\mu$-oxobis{isopropylidene($\eta^5$-tetramethylcyclopentadienyl)(3-tert-butyl-5-methyl-2-phenoxy)titanium}, di-$\mu$-oxobis{dimethylsilylene($\eta^5$-cyclopentadienyl)(2-phenoxy)titanium}, di-$\mu$-oxobis{dimethylsilylene($\eta^5$-cyclopentadienyl)(3-tert-butyl-5-methyl-2-phenoxy)titanium}, di-$\mu$-oxobis{dimethylsilylene($\eta^5$-methylcyclopentadienyl)(2-phenoxy)titanium}, di-$\mu$-oxobis{dimethylsilylene($\eta^5$-methylcyclopentadienyl)(3-tert-butyl-5-methyl-2-phenoxy) titanium}, di-$\mu$-oxobis{dimethylsilylene($\eta^5$-tetramethylcyclopentadienyl)(2-phenoxy)titanium}, di-$\mu$-oxobis{dimethylsilylene($\eta^5$-tetramethylcyclopentadienyl) (3-tert-butyl-5-methyl-2-phenoxy)titanium}; compounds wherein titanium of these compounds is replaced by zirconium or hafnium; compounds wherein ($\eta^5$-cyclopentadienyl) of these compounds is replaced ($\eta^5$-dimethylcyclopentadienyl),($\eta^5$-trimethylcyclopentadienyl), ($\eta^5$-n-butylcyclopentadienyl), ($\eta^5$-tert-butylcyclopentadienyl), ($\eta^5$-trimethylsilylcyclopentadienyl), ($\eta^5$-tert-butyldimethylsilylcyclopentadienyl), ($\eta^5$-indenyl), ($\eta^5$- methylindenyl), ($\eta^5$-phenylindenyl) or ($\eta^5$-fluorenyl); and compounds wherein (2-phenoxy) of these compounds is replaced by (3-methyl-2-phenoxy), (3,5-dimethyl-2-phenoxy), (3,5-di-tert-butyl-2-phenoxy), (3-phenyl-5-methyl-2-phenoxy) or (3-trimethylsilyl-5-methyl-2-phenoxy); and the like.

These transition metal compounds represented by the general formula (I) described above are known. For example, the transition metal compound represented by the general formula (I) can be produced, for example, by a method described in the WO 97/03992, and the transition metal compound represented by the general formula (II) or (III) can be produced, for example, by reacting a transition metal compound obtained according to the method described in the WO 97/03992 with 0.5-fold by mole or 1-fold by mole of water. Wherein a method of directly reacting a transition metal compound with a required amount of water, a method of charging a transition metal compound in a solvent such as a hydrocarbon containing a required amount of water, or the like, a method of charging a transition metal compound in a solvent such as a dry hydrocarbon or the like and further flowing an inert gas containing a required amount of water, or the like, etc. can be adopted.

(B) Modified Aluminum Oxy Compound

The modified aluminum oxy compound (B) used for the olefin polymerization catalyst for olefin polymerization of the present invention is a modified aluminum oxy compound obtained by reacting (B1) with (B2) described below:

(B1) an aluminum oxy compound, and (B2) a compound having a hydroxyl group.

(B1) Aluminum Oxy Compound

As the aluminum oxy compound (B1) used in the present invention, (C2) and/or (C3) in the aluminum compound (C) described below is preferably used.

As examples of the aluminum oxy compound, methylaluminoxane, tetramethylaluminoxane, pentamethylaluminoxane, hexamethylaluminoxane, heptamethylaluminoxane, ethylaluminoxane, propylaluminoxane, butylaluminoxane, isobutylaluminoxane, tetraisobutylaluminoxane, pentaisobutylaluminoxane, hexaisobutylaluminoxane, heptaisobutylaluminoxane, methylethylaluminoxane, methylbutylaluminoxane, methylisobutylaluminoxane and the like are exemplified. Methylaluminoxane, isobutylaluminoxane, tetraisobutylaluminoxane, hexaisobutylaluminoxane or methylisobutylaluminoxane is more preferable.

The aluminum oxy compounds may be used alone or in combination of 2 or more kinds.

(B2) Compound Having Hydroxyl Group

The compound having a hydroxyl group(B2) used for production of the modified aluminum oxy compound of the present invention is a compound having at least one hydroxyl group in its molecule, and an organic compound having a hydroxyl group is preferable. An alcohol compound, a phenol compound or a silanol compound is more preferable.

As the alcohol compound, the compound represented by the general formula described below is preferable.

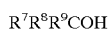

$R^7R^8R^9COH$ (wherein each of $R^7$, $R^8$ and $R^9$ independently indicates a hydrogen atom or a hydrocarbon group having 1 to 20 carbon atoms and a halogenated hydrocarbon group having 1 to 20 carbon atoms, and they may be mutually the same or different.)

The hydrocarbon group in the above-mentioned general formula includes an alkyl group, an aralkyl group, an aryl group and the like.

Specific examples of the alcohol compound include methyl alcohol, ethyl alcohol, n-propyl alcohol, isopropyl alcohol, n-butyl alcohol, isobutyl alcohol, tert-butyl alcohol, n-hexyl alcohol, n-octyl alcohol, n-decyl alcohol, triphenylmethyl alcohol, tricyclohexylmethyl alcohol, trifluoromethyl alcohol, perfluoroethyl alcohol, hexafluoroisopropyl alcohol, perfluoropropyl alcohol, perfluorobutyl alcohol and the like, and compounds whose fluoro is changed to chloro, bromo and iodo. A tertiary alcohol or an alcohol substituted with a halogen atom (halogenated alcohol) is preferable, and in particular, tert-butyl alcohol, triphenylmethyl alcohol, tricyclohexylmethyl alcohol, perfluoro-tert-butyl alcohol or 1,1,1,3,3,3-hexafluoroisopropyl alcohol is preferable.

As the phenol compound, non-substituted phenols or substituted phenols can be used. The substituent includes a halogen atom, or an alkyl, aralkyl, aryl, silyl, alkoxy, aralkyloxy, aryloxy or silyloxy group which may be substituted with a halogen atom, or the like.

The substituted phenol compound includes 2-substituted phenols such as 2-methylphenol, 2-ethylphenol, 2-n-butylphenol, 2-isobutylphenol, 2-tert-butylphenol, 2-n-propylphenol, 2-isopropylphenol, 2-phenylphenol, 2-fluorophenol, 2-chlorophenol, 2-bromophenol and the like; 3-substituted phenols such as 3-methylphenol, 3-ethylphenol, 3-n-butylphenol, 3-isobutylphenol, 3-tert-butylphenol, 3-n-propylphenol, 3-isopropylphenol, 3-phenylphenol, 3-fluorophenol, 3-chlorophenol, 3-bromophenol and the like; 4-substituted phenols such as 4-methylphenol, 4-ethylphenol, 4-n-butylphenol, 4-isobutylphenol, 4-tert-butylphenol, 4-n-propylphenol, 4-isopropylphenol, 4-phenylphenol, 4-fluorophenol, 4-chlorophenol, 4-bromophenol and the like; 2,6-substituted phenols such as 2,6-dimethylphenol, 2,6-diethylphenol, 2,6-di-n-butylphenol, 2,6-diisobutylphenol, 2,6-di-tert-butylphenol, 2,6-di-n-propylphenol, 2,6-diisopropylphenol, 2,6-diphenylphenol, 2,6-difluorophenol, 2,6-dichlorophenol, 2,6-dibromophenol and the like; 2,6,X-substituted phenols (X is one or more numerals selected from 3,4 and 5) such as 2,4,6-trimethylphenol, 2,6-di-tert-butyl-4-methylphenol, 2,3,5,6-tetrafluorophenol, pentafluorophenol and the like; 2,3-substituted phenols such as 2,3-difluorophenol and the like; 2,4-substituted phenols such as 2,4-difluorophenol and the like; 3,5-substituted phenols such as 3,5-dimethylphenol, 3,5-diethylphenol, 3,5-di-n-butylphenol, 3,5-diisobutylphenol, 3,5-di-tert-butylphenol, 3,5-di-n-propylphenol, 3,5-diisopropylphenol, 3,5-diphenylphenol, 3,5-difluorophenol, 3,5-dichlorophenol, 3,5-dibromophenol, 3,5-bistrifluoromethylphenol and the like; penta-substituted phenols such as pentafluorophenol, pentachlorophenol, pentamethylphenol and the like; and phenol compounds having 2 or more of hydroxy groups such as catechol, resorcinol, hydroquinone, bisphenol-A, 2,2-thiobis-6-tert-butyl-4-methylphenol and the like.

As the phenol compound, a halogenated phenol or a phenol having bulky substituents at 2,6-position is preferable, and in particular, pentafluorophenol is preferable.

Further, as the silanol compound, a compound represented by the general formula below is preferable.

$R^{10}R^{11}R^{12}SiOH$ (wherein each of $R^{10}$, $R^{11}$ and $R^{12}$ independently indicates a hydrogen atom or a hydrocarbon group having 1 to 20 carbon atoms and a halogenated hydrocarbon group having 1 to 20 carbon atoms, and they may be mutually the same or different.)

The hydrocarbon group in the above-mentioned general formula includes an alkyl group, an aralkyl group, an aryl group and the like.

As the silanol compound, a tertiary-silanol is preferable, and in particular, trimethylsilanol, triphenylsilanol or tricyclohexylsilanol is preferable.

As the compound having a hydroxyl group (B2) used in the present invention, an alcohol compound or a phenol compound is more preferable and in particular, pentafluorophenol, triphenylmethyl alcohol, tricyclohexylmethyl alcohol, perfluoro-tert-butyl alcohol or 1,1,1,3,3,3-hexafluoroisopropyl alcohol is preferable.

These compounds having a hydroxyl group may be used alone, or in combination of 2 or more kinds.

Production of Modified Aluminum Oxy Compound

The modified aluminum oxy compound of the present invention is obtained by reacting the aluminum oxy compound (B1) with the compound having a hydroxyl group (B2).

The reaction is preferably carried out under an inert gas atmosphere. The reaction temperature is not specifically limited, and is usually −80° C. to 200° C. and preferably −50° C. to 120° C. The reaction time is not specifically limited, and is usually 1 minute to 12 hours and preferably 2 minutes to 5 hours. Further, the reaction may be carried out in the presence or absence of a solvent. The solvent used is not specifically limited, and includes an aliphatic hydrocarbon solvent or an aromatic hydrocarbon solvent. Specific example includes hexane, heptane, benzene, toluene or the like.

The molar ratio of respective components used in the reaction is not specifically limited, and the molar ratio of the component (B1) (molar number converted to Al atom) to the component (B2) [(B1):(B2)] is preferably within a range of 1:0.001 to 1:1.1, more preferably 1:0.01 to 1:1.

The modified aluminum oxy compound obtained by the reaction described above can be used as a catalyst component for olefin polymerization after purification by isolation such as recrystallization or the like, but the reaction solution can be used for the catalyst component for olefin polymerization as it is.

(C) Aluminum Compound

The aluminum compound(C) used in the present invention is an aluminum compound selected from the following (C1) to (C3);

(C1) an organoaluminum compound represented by the general formula $E^1{}_aAlZ_{3-a}$, (C2) a cyclic aluminoxane having a structure represented by the general formula $\{-Al(E^2)-O-\}_b$, and (C3) a linear aluminoxane having a structure represented by the general formula $E^3\{-Al(E^3)-O-\}_cAlE^3{}_2$ (wherein $E^1$, $E^2$ and $E^3$ respectively represent a hydrocarbon group, all of $E^1$, $E^2$ and $E^3$ may be the same or different, Z represents a hydrogen atom or a halogen atom, and all of Z may be the same or different, a represents a numeral satisfying $0<a\leq3$, b represents an integer of not less than 2, and c represents an integer of not less than 1.)

As the hydrocarbon group in $E^1$, $E^2$ or $E^3$, a hydrocarbon group having 1 to 8 carbon atoms is preferable and an alkyl group is more preferable.

Specific examples of the organoaluminum compound (C1), represented by the general formula $E^1{}_aAlZ_{3-a}$ include trialkylaluminums such as trimethylaluminum, triethylaluminum, tri-n-propylaluminum, triisopropylaluminum, triisobutylaluminum, tri-n-hexylaluminum and the like; dialkylaluminum chlorides such as dimethylaluminum chloride, diethylaluminum chloride, di-n-propylaluminum chloride, diisopropylaluminum chloride, diisobutylaluminum chloride, di-n-hexylaluminum chloride and the like; alkylaluminum dichlorides such as methylaluminum dichloride, ethylaluminum dichloride, n-propylaluminum dichloride, isopropylaluminum dichloride, isobutylaluminum dichloride, n-hexylaluminum dichloride and the like; and dialkylaluminum hydrides such as dimethylaluminum hydride, diethylaluminum hydride, di-n-propylaluminum hydride, diisopropylaluminum hydride, diisobutylaluminum hydride, di-n-hexylaluminum hydride and the like, etc. Trialkylaluminums are preferable, and triethylaluminum and triisobutylaluminum are more preferred.

Specific examples of $E^2$ and $E^3$ in the cyclic aluminoxane (C2) having a structure represented by the general formula $\{-Al(E^2)-O-\}_b$ and the linear aluminoxane (C3) having a structure represented by the general formula $E^3-\{Al(E^3)-O-\}_cAlE^3{}_2$ include alkyl groups such as a methyl group, an ethyl group, a n-propyl group, an isopropyl group, a n-butyl group, an isobutyl group, a n-pentyl group, a neopentyl group, etc. b is an integer of not less than 2, c is an integer of not less than 1. Preferably, each of $E^2$ and $E^3$ is independently a methyl group or an isobutyl group, b is from 2 to 40 and c is from 1 to 40.

The above aluminoxane is prepared by various methods. The method is not specifically limited, and the aluminoxane may be prepared according to a publicly known method. For example, the aluminoxane is prepared by contacting a solution obtained by dissolving a trialkylaluminum (e.g. trimethylaluminum) in a suitable organic solvent (e.g. benzene, aliphatic hydrocarbon) with water. Also, there can be illustrated a method for preparing the aluminoxane by contacting a trialkylaluminum (e.g. trimethylaluminum, etc.) with a metal salt containing crystal water (e.g. copper sulfate hydrate, etc.).

In the present invention, the organoaluminum compound (C1) described above is particularly preferred.

(D) Boron Compound

As the boron compound (D) in the present invention, any one of the boron compound (D1) represented by the general formula $BQ^1Q^2Q^3$, the boron compound (D2) represented by the general formula $G^+(BQ^1Q^2Q^3Q^4)^-$ and the boron compound (D3) represented by the general formula $(L-H)^+(BQ^1Q^2Q^3Q^4)^-$ can be used.

In the boron compound(D1) represented by the general formula $BQ^1Q^2Q^3$, B represents a boron atom in the trivalent valence state; $Q^1$ to $Q^3$ are respectively a halogen atom, a hydrocarbon group, a halogenated hydrocarbon group, a substituted silyl group, an alkoxy group or a di-substituted amino group and they may be the same or different. Each of $Q^1$ to $Q^3$ is preferably a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or a di-substituted amino group having 2 to 20 carbon atoms, and each of more preferable $Q^1$ to $Q^3$ is a halogen atom, a hydrocarbon group having 1 to 20 carbon atoms or a halogenated hydrocarbon group having 1 to 20 carbon atoms. Each of the more preferable $Q^1$ to $Q^3$ is a fluorinated hydrocarbon group having 1 to 20 carbon atoms which contains at least one fluorine atom, and in particular, each of $Q^1$ to $Q^3$ is preferably a fluorinated aryl group having 6 to 20 carbon atoms which contains at least one fluorine atom.

Specific examples of the compound (D1) include tris (pentafluorophenyl)borane, tris(2,3,5,6-tetrafluorophenyl) borane, tris(2,3,4,-tetrafluorophenyl)borane, tris(3,4,5-trifluorophenyl)borane, tris(2,3,4-trifluorophenyl)borane, phenylbis(pentafluorophenyl)borane and the like, and tris (pentafluorophenyl)borane is most preferable.

In the boron compound (D2) represented by the general formula $G^+(BQ^1Q^2Q^3Q^4)^-$, $G^+$ is an inorganic or organic cation: B is a boron atom in the trivalent valence state; and $Q^1$ to $Q^4$ are the same as defined in $Q^1$ to $Q^3$ in the above-mentioned (D1).

Specific examples of $G^+$ as the inorganic cation in the compound represented by the general formula $G^+(BQ^1Q^2Q^3Q^4)^-$ include a ferrocenium cation, an alkyl-substituted ferrocenium cation, a silver cation and the like, and the $G^+$ as the organic cation includes a triphenylmethyl cation and the like. $G^+$ is preferably a carbenium cation, and a triphenylmethyl cation is particularly preferred. As the $(BQ^1Q^2Q^3Q^4)^-$, tetrakis(pentafluorophenyl)borate, tetrakis (2,3,5,6-tetrafluorophenyl)borate, tetrakis(2,3,4,5-tetrafluorophenyl)borate, tetrakis(3,4,5-trifluorophenyl) borate, tetrakis(2,3,4-trifluorophenyl)borate, phenyltris (pentafluorophenyl)borate, tetrakis(3,5-bistrifluoromethylphenyl)borate and the like are mentioned.

These specific combinations include ferrocenium tetrakis (pentafluorophenyl)borate, 1,1'-dimethylferrocenium tetrakis(pentafluorophenyl)borate, silver tetrakis (pentafluorophenyl)borate, triphenylmethyl tetrakis (pentafluorophenyl)borate, triphenylmethyl tetrakis(3,5-bistrifluoromethylphenyl)borate and the like, and triphenylmethyl tetrakis(pentafluorophenyl)borate is most preferable.

Further, in the boron compound (D3) represented by the formula $(L—H)^+(BQ^1Q^2Q^3Q^4)^-$, L is a neutral Lewis base; $(L—H)^+$ is a Brønsted acid; B is a boron atom in the trivalent valence state; and Q1 to Q4 are the same as $Q^1$ to $Q^3$ in the above-mentioned Lewis acid (D1).

Specific examples of $(L—H)^+$ as the Brønsted acid in the compound represented by the formula $(L—H)+(BQ^1Q^2Q^3Q^4)^-$ include a trialkyl-substituted ammonium, an N,N-dialkylanilinium, a dialkylammonium, a triarylphosphonium and the like, and examples of $(BQ^1Q^2Q^3Q^4)^-$ include those as previously described.

These specific combinations include triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-2, 4,6-pentamethylanilinium tetrakis(pentafluorophenyl) borate, N,N-dimethylanilinium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl) phosphonium tetrakis(pentafluorophenyl)borate, tri (dimethylphenyl)phosphonium tetrakis(pentafluorophenyl) borate and the like, and tri(n-butyl)ammoniumtetrakis (pentafluorophenyl)borate or N,N-dimethylaniliniumtetrakis(pentafluorophenyl)borate is most preferable.

Polymerization of Olefin

In the present invention, the catalyst for olefin polymerization using the above-mentioned (A), (B), (C) and (D) is used. In the present invention, the fore-mentioned respective components can be charged in an arbitrary order in the polymerization of an olefin, but a reaction product obtained by previously contacting an arbitrary combination of those components may be also used.

With respect to amounts of the respective components used, it is usually desirable to use the respective components so that the molar ratio of the modified aluminumoxy compound(B) to the transition metal compound (A) [transition metal atom contained in the transition metal compound] is 1 to 10000 and preferably 1 to 5000, the molar ratio of the aluminum compound(C) to the transition metal compound (A)[transition metal atom contained in the transition metal compound] is 0.1 to 10000 and preferably 5 to 2000, and the molar ratio of the boron compound(D)/the transition metal compound (A)[transition metal atom contained in the transition metal compound] is 0.01 to 100 and preferably 0.5 to 10.

The method for feeding the respective components in a polymerization reactor is not particularly limited, and after the transition metal compound(A) and the modified aluminumoxy compound(B), or the aluminum compound(C) and the boron compound(D) in addition to (A) and (B), are contacted, the resulted product may be fed in the reactor, or the components thereof without contacting may be separately fed in the reactor. Further, after some of the components are contacted, the remaining component(s) may be contacted therewith.

The respective catalyst components may be fed to the polymerization reactor in a solid state, in a state of a solution dissolved with a hydrocarbon solvent, in a suspension state or in a slurry state, or the like, and the state thereof at feeding is not particularly limited When the respective components are used as a solution or a suspension or slurry in which they are suspended or slurried in a solvent, the concentration of the respective components is appropriately selected according to the conditions such as the abilities of apparatuses for feeding the respective components in a polymerization reactor, etc. It is desirable to use the respective components so that the concentration of (A) is usually 0.001 to 200 mmol/L in terms of a transition metal atom contained in the transition metal compound (A), more preferably 0.001 to 100 mmol/L and further preferably 0.05 to 50 mmol/L; that of (B) is usually 0.01 to 5000 mmol/L, more preferably 0.1 to 2500 mmol/L and further preferably 0.1 to 2000 mmol/L: that of (C) is usually 0.01 to 5000 mmol/L, more preferably 0.1 to 2500 mmol/L and further preferably 0.1 to 2000 mmol/L, and that of (D) is usually 0.001 to 500 mmol/L, more preferably 0.01 to 250 mmol/L and further preferably 0.05 to 100 mmol/L.

The polymerization process should not be also specifically limited, and there can be a solvent polymerization or slurry polymerization in which an aliphatic hydrocarbon such as butane, pentane, hexane, heptane, octane or the like; an aromatic hydrocarbon such as benzene, toluene or the like; or a halogenated hydrocarbon such as methylene dichloride or the like is used as a polymerization medium. Further, a high pressure ionic polymerization in which the polymerization of an olefin is conducted without a solvent under which a produced olefin polymer is melt in the olefin in a supercritical liquid state at a high temperature under a high pressure, and a gas phase polymerization in a gaseous monomer and the like are possible. Further, both of a continuous polymerization and a batch-wise polymerization are possible.

The polymerization temperature can be usually adopted at a range of −50° C. to 350° C. and preferably −20° C. to 300° C. The polymerization pressure can be adopted at a range of usually 0.1 to 350 MPa and preferably 0.1 to 300 MPa.

In general, the polymerization time is appropriately determined according to the kind of a desired polymer and a reaction apparatus, and the conditions are not specifically limited and a range of 1 minute to 20 hours can be adopted. Further, a chain transfer agent such as hydrogen or the like can also be added to adjust the molecular weight of a copolymer in the present invention.

In the present invention, the polymerization is preferably performed by a high pressure ionic polymerization. Specifically, the polymerization is carried out at a temperature of 100° C. or more, preferably 135 to 300° C., under a pressure of at least 30 MPa, preferably 35 to 300 MPa.

The polymerization may be performed in a batch-wise manner or a continuous manner, preferably a continuous manner. As a reactor, a stirring vessel type reactor or a tubular reactor can be used. The polymerization can be performed in a single reaction zone. Alternatively, the polymerization can also be performed by partitioning one reactor into a plurality of reaction zones or communicating a plurality of reactors in series or parallel. In case of using a plurality of reactors, a combination of vessel reactors or a combination of a vessel reactor and a tubular reactor may be adopted. In a method for polymerizing using a plurality of reaction zones or a plurality of reactors, polymers having different characteristics can also be produced by changing the temperature, pressure and gas composition of each reaction zone.

As olefins which can be applied to the polymerization in the present invention, olefins having 2 to 20 carbon atoms such as, particularly, ethylene and an α-olefin having 3 to 20 carbon atoms, diolefins having 4 to 20 carbon atoms and the like can be used, and two or more of olefins described above as monomers can also be used, simultaneously. Specific examples of the olefin include straight chain olefins such as ethylene, propylene, 1-butene, 1-pentene, 1-hexene, 1-heptene, 1-octene, 1-nonene, 1-decene and the like; branched olefins such as 3-methyl-1-butene, 3-methyl-1-pentene, 4-methyl-1-pentene, 5-methyl-1-hexene and the like; vinylcyclohexane, etc., but the present invention should not be limited to the above-mentioned compounds. Specific examples of the combination of monomers in case of conducting copolymerization include combinations of ethylene with an α-olefin having 3 to 20 carbon atoms such as ethylene with propylene, ethylene with 1-butene, ethylene with 1-hexene, ethylene with 1-octene, a combination of propylene with 1-butene and the like, but the present invention should not be limited thereto.

The present invention can be effectively applied to the production of the copolymer of ethylene and the α-olefin such as in particular, propylene, 1-butene, 4-methyl-1-pentene, 1-hexene, 1-octene or the like.

EXAMPLE

The present invention is further illustrated in detail according to Examples and Comparative Examples below, but the present invention is not limited thereto.

Properties of the polymers in Examples were measured according to methods described below.

(1) Melting point of copolymer:

It was measured under the following conditions using SSC5000 thermal analysis system manufactured by Seiko Instruments Inc.

Heating: heating to 150° C. and maintaining for 5 minutes

Cooling: 150 to 10° C. (5° C./min.) and maintaining for 10 minutes

Measurement: 10 to 160° C. (5° C./min.)

(2) Content of α-olefin:

It was determined from the characteristic absorption of ethylene and α-olefin using an infrared spectrometer (FTIR1600 series, manufactured by Perkin-Elmer Inc.) and was represented as a short-chain branch (SCB) number per 1000 carbon atoms.

(3) Weight average molecular weight (Mw), number average molecular weight (Mn) and molecular weight distribution (Mw/Mn):

They were determined under the following conditions using gel permeation chromatograph (150, C, manufactured by Waters Co.).

Column: TSK gel GMH6-HT

Measurement temperature: set at 145° C.

Measurement concentration: 10 mg/10 ml ortho-dichlorobenzene (4) Intrinsic viscosity ([η]):

100 mg of a obtained copolymer was dissolved in 50 ml of tetralin at 135° C. and the solution was set in an oil bath maintained at 135° C. Using an Ubbelohde viscometer, the intrinsic viscosity was determined by the falling speed of the tetralin solution in which said sample was dissolved. (Unit: dl/g)

Reference Example 1

Synthesis of Transition Metal Compound dimethylsilylene($\eta^5$-tetramethylcyclopentadienyl)(3-tert-butyl-5-methyl-2-phenoxy)titanium dimethoxide)(Compound A1)

In a Schlenk tube, 0.131 g (4.1 mmol) of methyl alcohol was dissolved in 10 ml of anhydrous diethyl ether and a diethyl ether solution (3.9 ml, 4.1 mmol) of methyllithium having a concentration of 1.05 mol/L was added dropwise at −78° C. thereto. The resulting mixture was heated to 20° C., the formation of lithium methoxide was confirmed by gas generation, and the resulting reaction solution was again cooled to −78° C. Into the reaction solution, 20 ml of an anhydrous diethyl ether suspension liquid of 0.919 g (2.0 mmol) of dimethylsilylene($\eta^5$-tetramethylcyclopentadienyl)(3-tert-butyl-5-methyl-2-phenoxy)titanium dichloride which was previously prepared in another Schlenk tube was transferred, and then, the resulting reaction mixture was gradually heated to room temperature to obtain a reaction solution. After concentrating the reaction solution, 20 ml of toluene was added and an insoluble product was separated by filtration. The filtrate was concentrated to obtain dimethylsilylene($\eta^5$-tetramethylcyclopentadienyl)(3-tert-butyl-5-methyl-2-phenoxy)titanium dimethoxide represented by the structural formula described below of yellow crystals (0.86 g, 95%).

$^1$H-NMR (270 MHz, $C_6D_6$); δ7.26 (m, 2H), 4.13(s, 6H), 2.33 (s, 3H), 1.97(s, 6H), 1.89(s, 6H), 1.59(s, 9H), 0.55(s, 6H)

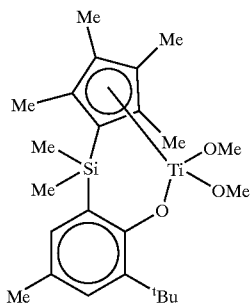

Reference Example 2

Preparation of Compound b1

After a dropping funnel was installed on a 50 ml 3-necked flask and the atmosphere was replaced with nitrogen, a thermometer was installed. Into the flask, 10 ml of methyl-isobutylaluminoxane (MMAO3A manufactured by Tosoh-Akzo Co., Ltd., heptane solution: 2 mol/1) and 10 ml of heptane were charged and the mixture was stirred. Into the dropping funnel, 10 ml of pentafluorophenol (toluene solution: 2 mol/1) was charged and added dropwise thereto at 15 to 20° C. After completion of the dropwise addition, the mixture was stirred at 25 to 30° C. for half an hour. A colorless transparent solution was obtained (the concentration of Al is 0.67 mol/l according to the charge amount). Hereinafter, this is described as "Compound b1 solution" in abbreviation.

Example 1

After the atmosphere of a 0.4 liter inner volume of autoclave type reactor equipped with a stirrer was replaced with argon, 185 ml of cyclohexane as a solvent and 15 ml of 1-hexene as an α-olefin were charged thereto, and the temperature of the reactor was raised to 180° C. After raising the temperature, ethylene was fed while adjusting its pressure at 2.5 Mpa. After the system was stabilized, 0.2 mmol of triisobutylaluminum, 1.5 ml (equivalent to 1 mmol converted to Al atom) of compound b1 solution, 0.5 ml (namely, 0.5 μmol of the compound A1 and 25 μmol of triisobutylaluminum) of a heptane solution in which the compound A1 and triisobutylaluminum were mixed (the concentration of the compound A1 was 1 μmol/ml and the concentration of triisobutylaluminum was 50 μmol/ml. A molar ratio of Al atom to Ti atom was adjusted at 50.), and 1.5 ml of a heptane slurry (the concentration of 1 μmol/ml) of N,N-dimethylanilinium(tetrakispentafluorophenyl)borate (hereinafter, described as "compound d1" in abbreviation) were charged. Polymerization was carried out for 2 minutes. As a result of the polymerization, 5.09 g of an ethylene-1-hexene copolymer having a [η] of 0.88 dl/g, an SCB of 35.3 and melting points of 74.5° C. and 87.0° C. was obtained. Polymerization activity based on 1 mole of Ti atom was $1.0 \times 10^7$ g/mol-Ti per 2 minutes.

Comparative Example 1

Polymerization was carried out in the same manner as in Example 1 except that Compound b1 solution was not used. 2.33 g of an ethylene-hexene-1 copolymer having an [η] of 1.04 dl/g, a SCB of 31.7, melting points of 78.3° C. and 89.90° C., a Mw of 56500 and a Mw/Mn of 1.9 was obtained. Polymerization activity based on 1 mole of Ti atom was $4.7 \times 10^6$ g/mol-Ti per 2 minutes.

Comparative Example 2

After the atmosphere of a 0.4 liter inner volume of autoclave type reactor equipped with a stirrer was replaced with argon, 185 ml of cyclohexane as a solvent and 15 ml of 1-hexene as an α-olefin were charged thereto, and the temperature of the reactor was raised to 180° C. After raising the temperature, ethylene was fed while adjusting its pressure at 2.5 Mpa. After the system was stabilized, 0.72 ml (equivalent to 0.5mmol converted to Al atom) of polybutylaluminoxane (PBAO manufactured by Tosoh-Akzo Co., Ltd., and hexane solution: 0.68 mol/l), and 0.5 ml (namely, 0.5 μmol of the compound A1 and 25 μmol of PBAO) of a heptane solution in which the compound A1 and PBAO were mixed (the concentration of the compound A1 was 1 μmol/ml and the concentration of PBAO was 50 μmol/ml. A molar ratio of Al atom to Ti atom was adjusted at 50.), and 1.5 ml of the heptane slurry of the compound d1 (the concentration of 1 μmol/ml) were charged. Polymerization was carried out for 2 minutes. As a result of the polymerization, 2.20 g of an ethylene-hexene-1 copolymer having an [η] of 0.98 dl/g, a SCB of 34.8, melting points of 73.6° C. and 84.9° C., a Mw of 56300 and a Mw/Mn of 2.4 was obtained. Polymerization activity based on 1 mole of Ti atom was $4.4 \times 10^6$ g/mol-Ti per 2 minutes.

Reference Example 3

Preparation of Compound b2

After a dropping funnel was installed on a 50 ml 3-necked flask and the atmosphere was replaced with nitrogen, a thermometer was installed. Into the flask, 3 ml of methyl-isobutylaluminoxane (MMAO3A manufactured by Tosoh-Akzo Co., Ltd., heptane solution: 2 mol/l) and 3 ml of heptane were charged and the mixture was stirred. Into the dropping funnel, 6 ml of triphenylmethyl alcohol (heptane solution: 1 mol/l) was charged and added dropwise thereto at 15 to 20° C. After completion of the dropwise addition, the mixture was stirred at 25 to 30° C. for half an hour. A colorless transparent solution was obtained (the concentration of Al was 0.5 mol/l according to the charge amount). Hereinafter, this is described as "compound b2 solution" in abbreviation.

Example 2

Polymerization was carried out in the manner as in Example 1 except that 2 ml (equivalent to 1 mmol converted to Al atom) of compound b2 solution was used in place of using 1.5 ml of compound b1 solution. As a result of the polymerization, 5.9 g of an ethylene-1-hexene copolymer having an [η] of 0.70 dl/g, a SCB of 35.1, melting points of 74.5° C. and 85.9° C., a Mw of 40500 and a Mw/Mn of 2.4 was obtained. Polymerization activity based on 1 mole of Ti atom was $1.2 \times 10^7$ g/mol-Ti per 2 minutes.

Reference Example 4

Preparation of compound b3

After a dropping funnel was installed on a 50 ml 3-necked flask and the atmosphere was replaced with nitrogen, a thermometer was installed. Into the flask, 5 ml of hexaisobutylaluminoxane (HIBAO manufactured by Witco Co., Ltd., hexane solution: 1.3 mol/l) and 4.8 ml of heptane were charged and the mixture was stirred. Into the dropping funnel, 3.3 ml of pentafluorophenol (toluene solution: 2 mol/l) was charged and added dropwise thereto at 25 to 30° C. After completion of the dropwise addition, the mixture was stirred at 25 to 30° C. for half an hour. A white slurry was obtained (the concentration of Al was 0.5 mol/l according to the charge amount). Hereinafter, this is described as "compound b3 slurry" in abbreviation.

Example 3

Polymerization was carried out in the same manner as in Example 1 except that 0.1 ml (equivalent to 0.05 mmol converted to Al atom) of Compound b3 slurry was used in place of using 1.5 ml of Compound b1 solution. As a result of the polymerization, 3.23 g of an ethylene-hexene-1 copolymer having an [η] of 0.97 dl/g, a SCB of 32.3, melting points of 75.5° C. and 88.6° C., a Mw of 54900 and a Mw/Mn of 1.9 was obtained. Polymerization activity based on 1 mole of Ti atom was $6.5 \times 10^6$ g/mol-Ti per 2 minutes.

Reference Example 5

Preparation of Compound b4

After a dropping funnel was installed on a 50 ml 3-necked flask and the atmosphere was replaced with nitrogen, a thermometer was installed. Into the flask, 10 ml of polybutylaluminoxane (PBAO manufactured by Tosoh-Akzo Co., Ltd., and hexane solution: 0.96 mol/l) and 7.2 ml of heptane were charged and the mixture was stirred. Into the dropping funnel, 3.82 ml of pentafluorophenol (toluene solution: 2 mol/l) was charged and added dropwise thereto at 25 to 30° C. After completion of the dropwise addition, the mixture was stirred at 25 to 30° C. for one hour. A colorless transparent solution was obtained (the concentration of Al was 0.5 mol/l according to the charge amount). Hereinafter, this is described as "Compound b4 solution" in abbreviation.

Example 4

After the atmosphere of a 0.4 liter inner volume of autoclave type reactor equipped with a stirrer was replaced with argon, 185 ml of cyclohexane as a solvent and 15 ml of 1-hexene as an α-olefin were charged thereto, and the temperature of the reactor was raised to 180° C. After raising the temperature, ethylene was fed while adjusting its pressure at 2.5 Mpa. After the system was stabilized, 1 ml (equivalent to 0.5 mmol converted to Al atom) of the compound b4 solution, and 0.5 ml of a heptane solution in which the compound a1 and triisobutylaluminum (0.5 μmol of the compound a1, 25 μmol of triisobutylaluminum) were mixed (the concentration of the compound al was 1 μmol/ml and the concentration of triisobutylaluminum was 50 μmol/ml and the molar ratio of Al atom to Ti atom was adjusted at 50.), and 1.5 ml of the heptane slurry of the compound d1 (the concentration of 1 μmol/ml) were charged. As a result of the polymerization, 5.2 g of an ethylene-hexene-1 copolymer having an [η] of 1.45 dl/g, a SCB of 32.0, melting points of 75.5° C. and 85.2° C., a Mw of 95500 and a Mw/Mn of 1.9 was obtained. Polymerization activity based on 1 mole of Ti atom was $1.0 \times 10^7$ g/mol-Ti per 2 minutes.

Comparative Example 3

After the atmosphere of a 0.4 liter inner volume of autoclave type reaction equipment equipped with a stirrer was replaced with argon. 185 ml of cyclohexane as a solvent and 15 ml of 1-hexene as an α-olefin were charged thereto, and the temperature of the reaction vessel was raised to 180° C. After raising the temperature, ethylene was fed while adjusting its pressure at 2.5 Mpa. After the inside of the system was stabilized, 1 ml (equivalent to 0.5 mmol converted to Al atom) of Compound b4 solution, and 0.5 ml (namely, 0.5 μmol of the compound a2 and 25 μmol of triisobutylaluminum) of a heptane solution in which dimethylsilylene(tert-butylamido) (tetramethylcyclopentadienyl)titanium dichloride (the compound a2) and triisobutylaluminum were mixed (the concentration of the compound a2 was 1 μmol/ml and the concentration of triisobutylaluminum was 50 μmol/ml. A molar ratio of Al atom to Ti atom was adjusted at 50.) were charged. Polymerization was carried out for 2 minutes. As a result of the polymerization, 0.2 g of an ethylene-1-hexene copolymer was obtained. Polymerization activity based on 1 mole of Ti atom was $4 \times 10^5$ g/mol-Ti per 2 minutes.

Comparative Example 4

After the atmosphere of a 0.4 liter inner volume of autoclave type reactor equipped with a stirrer was replaced with argon, 185 ml of cyclohexane as a solvent and 15 ml of 1-hexene as an α-olefin were charged thereto, and the temperature of the reaction vessel was raised to 180° C. After raising the temperature, ethylene was fed while adjusting its pressure at 2.5 Mpa. After the inside of the system was stabilized, 1 ml (equivalent to 0.5 mmol converted to Al atom) of Compound b4 solution, and 0.5 ml (namely, 0.5 a mol of the compound a3 and 50 μmol of triisobutylaluminum) of a toluene solution in which bis(n-butylcyclopentadienyl)zirconium dichloride (the compound a3) and triisobutylaluminum were mixed (the concentration of the compound a3 was 1 μmol/ml and the concentration of triisobutylaluminum was 100 μmol/ml. A molar ratio of Al atom to Zr atom was adjusted to 100.) were charged. Polymerization was carried out for 2 minutes. As a result of the polymerization, 0.23 g of an ethylene-1-hexene copolymer was obtained. Polymerization activity based on 1 mole of Ti atom was $4.6 \times 10^5$ g/mol-Zr per 2 minutes.

Reference Example 6

Preparation of Compound b5

After a dropping funnel was installed on a 50 ml 3-necked flask and the atmosphere was replaced with nitrogen, a thermometer was installed. Into the flask, 5 ml of hexaisobutylaluminoxane (HIBAO manufactured by Witco Co., Ltd., hexane solution: 1.3 mol/l) and 6.46 ml of heptane were charged and the mixture was stirred. Into the dropping funnel, 1.64 ml of pentafluorophenol (toluene solution: 2 mol/l) was charged and added dropwise thereto at 25 to 30° C. After completion of the dropwise addition, the mixture was stirred at 25 to 30° C. for half an hour. A white slurry was obtained (the concentration of Al was 0.5 mol/l according to the charge amount). Hereinafter, this is described as "Compound b5 slurry" in abbreviation.

Example 5

Polymerization was carried out in the same manner as in Example 4 except that 1 ml (equivalent to 0.5 mmol converted to Al atom) of the compound b5 slurry was used in place of using 1 ml of the compound b4 solution. As a result of the polymerization, 6.17 g of an ethylene-hexene-1 copolymer having an [η] of 1.25 dl/g, a SCB of 31.3, melting points of 73.6° C., and 85.8° C., a Mw of 75100 and a Mw/Mn of 2.3 was obtained. Polymerization activity based on 1 mole of Ti atom was $1.2 \times 10^7$ g/mol-Ti per 2 minutes.

Reference Example 7

Preparation of Compound b6

After a dropping funnel was installed on a 50 ml 3-necked flask and the atmosphere was replaced with nitrogen, a thermometer was installed. Into the flask, 5 ml of tetraisobutylaluminoxane (TIBAO manufactured by Witco Co., Ltd., cyclohexane solution: 1.7 mol/l) and 1.4 ml of heptane were charged and the mixture was stirred. Into the dropping funnel, 4.25 ml of pentafluorophenol (toluene solution: 2 mol/l) was charged and added dropwise thereto at 25 to 30° C. After completion of the dropwise addition, the mixture was stirred at 25 to 30° C. for half an hour. A white slurry was obtained (the concentration of Al was 0.8 mol/l according to the charge amount). Hereinafter, this is described as "Compound b6 slurry" in abbreviation.

Example 6

Polymerization was carried out in the same manner as in Example 4 except that 0.63 ml (equivalent to 0.5 mmol converted to Al atom) of the compound b6 slurry was used in place of using 1 ml of the compound b4 solution. As a result of the polymerization, 6.30 g of an ethylene-1-hexene copolymer having an [η] of 1.31 dl/g, a SCB of 30.9, melting points of 75.2° C. and 86.4° C., a Mw of 79100 and a Mw/Mn of 2.2 was obtained. Polymerization activity based on 1 mole of Ti atom was $1.3 \times 10^7$ g/mol-Ti per 2 minutes.

Reference Example 8

Preparation of Compound b7

After a dropping funnel was installed on a 50 ml 3-necked flask and the atmosphere was replaced with nitrogen, a thermometer was installed. Into the flask, 11.6 ml of polybutylaluminoxane (PBAO manufactured by Tosoh-Akzo Co., Ltd., and hexane solution: 0.955 mol/l) and 8.34 ml of toluene were charged and the mixture was stirred. Into the dropping funnel, 2.22 ml of pentafluorophenol (toluene solution: 2 mol/l) was charged and added dropwise thereto at 15 to 20° C. After completion of the dropwise addition, the mixture was stirred at 25 to 30° C. for half an hour. A colorless transparent solution was obtained. After the atmosphere of another 50 ml 2-necked flask was replaced with nitrogen, a thermometer was installed. Into the flask, 1.5 ml of the above-mentioned reaction solution was charged, and 0.45 ml of toluene and 0.3 ml of trimethylsilyl alcohol (toluene solution: 1 mol/l) were added dropwise thereto at 25 to 30° C. After completion of the dropwise addition, the mixture was stirred at 25 to 30° C., for half an hour. A colorless transparent solution was obtained (the concentration of Al was 0.33 mol/l according to the charge amount). Hereinafter, this is described as "Compound b7 solution" in abbreviation.

Example 7

Polymerization was carried out in the same manner as in Example 4 except that 1.5 ml (equivalent to 0.5 mmol converted to Al atom) of the compound b7 solution was used in place of using 1 ml of the compound b4 solution. As a result of the polymerization, 2.78 g of an ethylene-1-hexene copolymer having an [η] of 1.64 dl/g, a SCB of 29.7, melting points of 77.7° C. and 86.1° C., a Mw of 100800 and a Mw/Mn of 1.9 was obtained. Polymerization activity based on 1 mole of Ti atom was $5.7 \times 10^6$ g/mol-Ti per 2 minutes.

Set forth below in a tabular form is a summary of results obtained utilizing Examples and Comparative Examples disclosed above.

TABLE 1

| | Catalyst | Co-Cat. | Al/Ti | Used Aluminoxane | Modifier | Activity (g/mol-Ti, 2 min) |
|---|---|---|---|---|---|---|
| Example 1 | Al | b1 | 50 | MMAO-3A | pentafluorophenol | $1.0 \times 10^7$ |
| Co-Example 1 | Al | — | 50 | — | — | $4.7 \times 10^6$ |
| Co-Example 2 | Al | — | 50 | PBAO | — | $4.4 \times 10^6$ |
| Example 2 | Al | b2 | 50 | MMAO-3A | triphenylmethyl alcohol | $1.2 \times 10^7$ |
| Example 3 | Al | b3 | 50 | HIBAO | pentafluorophenol | $6.5 \times 10^6$ |
| Example 4 | Al | b4 | 50 | PBAO | pentafluorophenol | $1.0 \times 10^7$ |
| Co-Example 3 | CGC-Ti | b4 | 50 | PBAO | pentafluorophenol | $4 \times 10^5$ |
| Co-Example 4 | nBuCp-Zr | b4 | 100 | PBAO | pentafluorophenol | $4.6 \times 10^5$ |
| Example 5 | Al | b5 | 50 | HIBAO | pentafluorophenol | $1.2 \times 10^7$ |
| Example 6 | Al | b6 | 50 | TIBAO | pentafluorophenol | $1.3 \times 10^7$ |
| Example 7 | Al | b7 | 50 | IBAO | pentafluorophenol trimethylsilyl alcohol | $5.7 \times 10^8$ |

Polymerization Condition 0.4-liter autoclave
cyclohexane: 185 ml
ethylene: 2.5 Mpa
hexane-1: 15 ml
triisobutylaluminum: 0.2 mmol
N,N-dimethylanilinium(tetrakispentafluorophenyl)borate: 1.5 μmol
polymerization temperature: 180° C.
polymerization time: 2 min.
CGC-Ti
  dimethylsilylene(tert-butylamido)(tetramethylcyclopentadienyl)titanium dichloride
nBuCp-Zr
  (n-butylcyclopentadienyl)zirconium dichloride.

As described above in detail, according to the present invention, a highly active olefin polymerization catalyst obtained by using a modified aluminumoxy compound and a process for producing an olefin polymer using said olefin polymerization catalyst are provided.

What is claimed is:
1. An olefin polymerization catalyst prepared by contacting (A) with (B) described below:
   (A) a transition metal compound selected from the group consisting of transition metal compounds represented by the general formulas (I), (II) or (III);

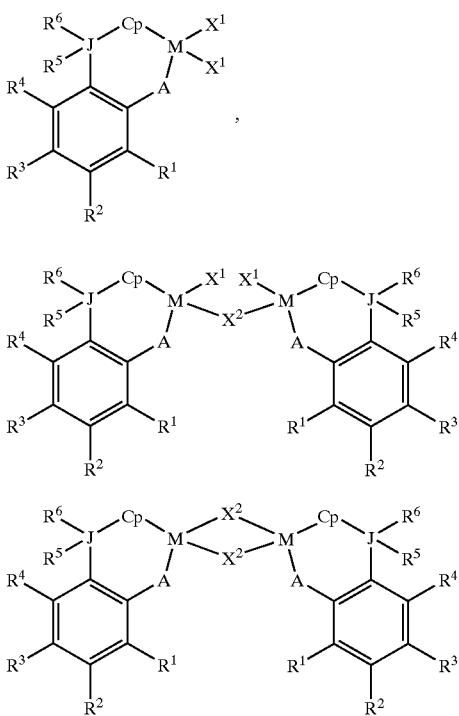

wherein, in the general formula (I), (II) or (III), M represents a transition metal atom of the Group IV of the Periodic Table of the Elements; A represents an atom of the Group XVI of the Periodic Table of the Elements; J represents an atom of the Group XIV of the Periodic Table of the Elements; Cp represents a group having a cyclopentadiene type anion skeleton; each of $X^1$, $R^1$, $R^2$, $R^3$, $R^4$, $R^5$ and $R^6$ independently represents a hydrogen atom, a halogen atom, an alkyl group, an aralkyl group, an aryl group, a substituted silyl group, an alkoxy group, an aralkyloxy group, an aryloxy group, a di-substituted amino group, an alkylthio group, an aralkylthio group, an arylthio group, an alkylseleno group, an aralkylseleno group or arylseleno group; $X^2$ represents an atom of Group XVI of the Periodic Table of the Elements; $R^1$, $R^2$, $R^3$, $R^4$, $R^5$ and $R^6$ may be optionally combined with each other to form a ring; and in the general formula (II) or (III), two of M, A, J, Cp, $X^1$, $X^2$, $X^3$, $R^1$, $R^2$, $R^3$, $R^4$, $R^5$ and $R^6$ may be respectively the same or different, (B) a modified aluminum oxy compound (B) obtained by reacting (B1) with (B2) described below;
(B1) an aluminum oxy compound, and
(B2) a compound having a hydroxyl group.

2. An olefin polymerization catalyst according to claim 1, prepared by further contacting (C), (D) or ((C) and (D)) described below:

(C) at least one aluminum compound selected from the following (C1) to (C3);
(C1) an organoaluminum compound represented by the general formula $E^1{}_a AlZ_{3-a}$,
(C2) a cyclic aluminoxane having a structure represented by the general formula $\{-Al(E^2)-O-\}_b$, and
(C3) a linear aluminoxane having a structure represented by the general formula $E^3\{-Al(E^3)-O-\}_c AlE^3{}_2$ (wherein $E^1$, $E^2$ and $E^3$ respectively represents a hydrocarbon group, all of $E^1$, $E^2$ and $E^3$ may be the same or different, Z represents a hydrogen atom or a halogen atom, and all of Z may be the same or different, a represents a numeral satisfying $0<a\leq3$, b represents an integer of not less than 2, and c represents an integer of not less than 1); and (D) any one of boron compounds of (D1) to (D3) described below:
(D1) a boron compound represented by the general formula $BQ^1Q^2Q^3$;
(D2) a boron compound represented by the general formula $G^+(BQ^1Q^2Q^3Q^4)^-$; and
(D3) a boron compound represented by the general formula $(L-H)^+(BQ^1Q^2Q^3Q^4)^-$
wherein B is a boron atom in the trivalent valence state;
$Q^1$ to $Q^4$ are a halogen atom, a hydrocarbon group, a halogenated hydrocarbon group, a substituted silyl group, an alkoxy group or a di-substituted amino group which may be the same or different; $G^+$ is an inorganic or organic cation; L is a neutral Lewis base; and $(L-H)^+$ is a Brønsted acid.

3. The polymerization catalyst according to claim 2, wherein the compound (C) is an organoaluminum compound (C1) represented by the general formula $E^1{}_a AlZ_{3-a}$, wherein $E^1$ represents a hydrocarbon group, Z represents a hydrogen atom or a halogen atom, and all of Z may be the same or different, and a represents a numeral satisfying $0<a\leq3$.

4. The polymerization catalyst according to claim 2, wherein the boron compound(D) is dimethylaniliniumtetrakis(pentafluorophenyl)borate or triphenylmethyl tetrakis(pentafluorophenyl)borate.

5. The polymerization catalyst according to claim 1, wherein the aluminumoxy compound (B1) is a member selected from the group consisting of a cyclic aluminoxane (C2) having a structure represented by the general formula $\{-Al(E^2)-O-\}_b$ and a linear aluminoxane (C3) having a structure represented by the general formula $E^3\{-Al(E^3)-O-\}_c AlE^3{}_2$, wherein $E^2$ and $E^3$ represent hydrocarbon groups that may be the same or different, b represents an integer of not less than 2, and c represents an integer of not less than 1.

6. The polymerization catalyst according to claim 5, wherein the aluminumoxy compound (B1) is a member selected from the group consisting of methylaluminoxane, isobutylaluminoxane, tetraisobutylaluminoxane, hexaisobutylaluminoxane and methylisobutylaluminoxane.

7. The polymerization catalyst according to claim 1, wherein the compound having a hydroxy group (B2) is a member selected from the group consisting of alcohol compounds, phenol compounds and silanol compounds.

8. The polymerization catalyst according to claim 1, wherein the compound having a hydroxy group (B2) is a member selected from the group consisting of tertiary alcohols, halogenated alcohols, halogenated phenols and phenol compounds having bulky groups at 2,6-position.

9. A process for producing an olefin polymer, which comprises polymerizing an olefin with the olefin polymerization catalyst of claim 1.

10. A process for producing an olefin polymer, which comprises polymerizing an olefin with the olefin polymerization catalyst of claim 2.

11. A process for producing an olefin polymer, which comprises polymerizing an olefin with the olefin polymerization catalyst of claim 3.

12. A process for producing an olefin polymer, which comprises polymerizing an olefin with the olefin polymerization catalyst of claim 4.

13. A process for producing an olefin polymer, which comprises polymerizing an olefin with the olefin polymerization catalyst of claim 5.

14. A process for producing an olefin polymer which comprises polymerizing an olefin with the olefin polymerization catalyst of claim 6.

15. A process for producing an olefin polymer which comprises polymerizing an olefin with the olefin polymerization catalyst of claim 7.

16. A process for producing an olefin polymer which comprises polymerizing an olefin with the olefin polymerization catalyst of claim 8.

17. The process according to claim 9, wherein the olefin is a combination of ethylene with an α-olefin having 3 to 20 carbon atoms.

18. The process according to claim 10, wherein the olefin is a combination of ethylene with an α-olefin having 3 to 20 carbon atoms.

19. The process according to claim 11, wherein the olefin is a combination of ethylene with an α-olefin having 3 to 20 carbon atoms.

20. The process according to claim 12, wherein the olefin is a combination of ethylene with an α-olefin having 3 to 20 carbon atoms.

21. The process according to claim 13, wherein the olefin is a combination of ethylene with an α-olefin having 3 to 20 carbon atoms.

22. The process according to claim 14, wherein the olefin is a combination of ethylene with an α-olefin having 3 to 20 carbon atoms.

23. The process according to claim 15, wherein the olefin is a combination of ethylene with an α-olefin having 3 to 20 carbon atoms.

24. The process according to claim 16, wherein the olefin is a combination of ethylene with an α-olefin having 3 to 20 carbon atoms.

* * * * *